United States Patent
Yeo et al.

(10) Patent No.: US 12,324,013 B2
(45) Date of Patent: Jun. 3, 2025

(54) APPARATUS AND METHOD FOR TRANSMITTING OR RECEIVING SIGNAL IN WIRELESS COMMUNICATION SYSTEM

(71) Applicant: Samsung Electronics Co., Ltd., Suwon-si (KR)

(72) Inventors: Jeongho Yeo, Suwon-si (KR); Sungjin Park, Suwon-si (KR); Younsun Kim, Suwon-si (KR); Hyunseok Ryu, Suwon-si (KR); Jonghyun Bang, Suwon-si (KR); Cheolkyu Shin, Suwon-si (KR); Jinyoung Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 456 days.

(21) Appl. No.: 17/767,411

(22) PCT Filed: Oct. 7, 2020

(86) PCT No.: PCT/KR2020/013623
§ 371 (c)(1),
(2) Date: Apr. 7, 2022

(87) PCT Pub. No.: WO2021/071223
PCT Pub. Date: Apr. 15, 2021

(65) Prior Publication Data
US 2023/0057836 A1    Feb. 23, 2023

(30) Foreign Application Priority Data
Oct. 7, 2019    (KR) .................. 10-2019-0124184

(51) Int. Cl.
*H04W 72/566*    (2023.01)
*H04L 1/1829*    (2023.01)
(Continued)

(52) U.S. Cl.
CPC ......... *H04W 72/569* (2023.01); *H04L 1/1854* (2013.01); *H04L 1/1887* (2013.01);
(Continued)

(58) Field of Classification Search
CPC . H04W 72/12; H04W 72/1242; H04W 72/25; H04W 72/40; H04W 28/0875;
(Continued)

(56) References Cited

U.S. PATENT DOCUMENTS

2016/0066356 A1* 3/2016 Lindoff ............... H04W 72/535
370/329
2018/0206259 A1* 7/2018 Wang .................... H04W 28/16
(Continued)

FOREIGN PATENT DOCUMENTS

KR   10-2018-0080199 A   7/2018
KR   10-2019-0008387 A   1/2019
(Continued)

OTHER PUBLICATIONS

InterDigital, Inc., "Physical Layer Procedures for NR V2X Sidelink", 3GPP TSG RAN WG1 #98, Aug. 26-30, 2019, R1-1909032, 12 pages.
(Continued)

*Primary Examiner* — Warner Wong

(57) ABSTRACT

The present disclosure relates to a communication technique for combining IoT technology with a 5G communication system for supporting a higher data transmission rate than a 4G system, and a system therefor. The present disclosure can be applied to intelligent services (for example, smart homes, smart buildings, smart cities, smart cars or connected cars, health care, digital education, retail businesses, security and safety-related services, and the like) on the basis of 5G communication technologies and IoT-related technologies. According to various embodiments of the present disclosure,
(Continued)

a method of a first terminal (user equipment, UE) in a wireless communication system may comprise the steps of: when reception of a first physical sidelink feedback channel (PSFCH) for a first physical sidelink shared channel (PSSCH) and transmission of a second PSFCH for a second PSFCH overlap in a time domain, determining a PSFCH on the basis of first sidelink control information (SCI) related to the first PSFCH and second SCI related to the second PSFCH; and transmitting or receiving feedback information through the determined PSFCH.

20 Claims, 24 Drawing Sheets

(51) Int. Cl.
  *H04L 1/1867* (2023.01)
  *H04L 5/00* (2006.01)
  *H04L 1/1812* (2023.01)
  *H04W 72/40* (2023.01)
  *H04W 76/23* (2018.01)

(52) U.S. Cl.
  CPC .......... *H04L 5/0055* (2013.01); *H04L 1/1812* (2013.01); *H04W 72/40* (2023.01); *H04W 76/23* (2018.02)

(58) Field of Classification Search
  CPC .... H04W 76/23; H04L 1/1854; H04L 1/1829; H04L 1/1867; H04L 1/1887; H04L 5/0053; H04L 5/0055; H04L 1/18; H04L 1/1812; H04L 1/0073
  See application file for complete search history.

(56) References Cited

U.S. PATENT DOCUMENTS

| | | | |
|---|---|---|---|
| 2018/0234980 A1* | 8/2018 | Li | H04W 74/0816 |
| 2018/0263026 A1 | 9/2018 | Loehr et al. | |
| 2019/0045526 A1 | 2/2019 | Lee et al. | |
| 2019/0174530 A1 | 6/2019 | Kim et al. | |
| 2020/0196255 A1* | 6/2020 | Cheng | H04L 5/0064 |
| 2020/0205165 A1* | 6/2020 | Huang | H04L 1/1854 |
| 2020/0205166 A1* | 6/2020 | Huang | H04W 76/27 |
| 2020/0351032 A1* | 11/2020 | Wu | H04W 72/20 |
| 2021/0028910 A1* | 1/2021 | Cheng | H04L 1/1854 |
| 2021/0050958 A1* | 2/2021 | Sarkis | H04L 1/1854 |
| 2021/0075552 A1* | 3/2021 | Huang | H04L 1/1854 |
| 2021/0266922 A1* | 8/2021 | Zhao | H04W 72/56 |
| 2021/0345360 A1 | 11/2021 | Yeo et al. | |
| 2022/0116996 A1* | 4/2022 | Lee | H04W 74/0816 |
| 2022/0330261 A1* | 10/2022 | Yeo | H04L 5/0053 |
| 2023/0308247 A1* | 9/2023 | Kim | H04L 5/0055 |

FOREIGN PATENT DOCUMENTS

| | | |
|---|---|---|
| KR | 10-2020-0018210 A | 2/2020 |
| KR | 10-2018-0033589 A | 11/2021 |
| WO | 2020/222560 A1 | 11/2020 |

OTHER PUBLICATIONS

LG Electronics, "Discussion on physical layer procedures for NR sidelink", 3GPP TSG RAN WG1 Meeting #98, Aug. 26-30, 2019, R1-1908906, 19 pages.
Supplementary European Search Report dated Nov. 4, 2022 in connection with European Patent Application No. 20 87 4416, 10 pages.
International Search Report and Written Opinion of the International Searching Authority dated Jan. 29, 2021, in connection with International Application No. PCT/KR2020/013623, 9 pages.
CATT, "Feature lead summary on AI 7.2.4.3 Sidelink synchronization mechanism," R1-1909683, 3GPP TSG RAN WG1 Meeting #98, Prague, Czech Republic, Aug. 26-30, 2019, 32 pages.
Futurewei, "Feature lead summary#3 of AI 7.2.4.7: Support of NR Uu controlling LTE sidelink," R1-1909811, 3GPP TSG RAN WG1 Meeting #98, Prague, Czech Republic, Aug. 26-30, 2019, 5 pages.
LG Electronics [RAN1], "[Draft] LS on simultaneous transmission of PSFCH," R1-1909873, 3GPP TSG RAN WG1 #98, Prague, Czech Republic, Aug. 26-30, 2019, 2 pages.
Nokia, et al., "[Draft] Response LS on additional TDD configuration periodicities, " R1-1809797, 3GPP TSG-RAN WG1 Meeting #94, Gothenburg, Sweden, Aug. 20-24, 2018, 1 page.
Qualcomm [TSG RAN WG1], "[Draft] LS on mapping between LTE V2X PPPPP and NR V2X priority," R1-1909818, 3GPP TSG-RAN WG1#98, Prague, Czech Republic, Aug. 26-30, 2019, 1 page.
RAN1, "[Draft] LS to RAN4 on NR V2X S-SSB design," R1-1909788, 3GPP TSG RAN WG1 Meeting #98, Prague, Czech Republic, Aug. 26-30, 2019, 2 pages.
RAN1, "LS to RAN4 on NR V2X S-SSB design," R1-1909874, 3GPP TSG RAN WG1 Meeting #98, Prague, Czech Republic, Aug. 26-30, 2019, 2 pages.
Sony, "Discussion on physical layer procedures for NR sidelink," R1-1908772, 3GPP TSG RAN WG1 #98, Prague, Czech Republic, Aug. 26-30, 2019, 5 pages.
Vivo, "Discussion on mode 1 resource allocation mechanism," R1-1910212, 3GPP TSG RAN WG1 Meeting #98bis, Chongqing, China, Oct. 14-20, 2019, 15 pages.
Notice of Preliminary Rejection dated Jan. 13, 2025, in connection with Korean Application No. 10-2019-0124184, 11 pages.
Communication pursuant to Article 94(3) EPC dated Apr. 16, 2025, in connection with European Application No. 20874416.9, 7 pages.
Nokia, et al., "Discussion of physical layer structure for sidelink," RI-1908282, 3GPP TSG RAN WG1 Meeting #98, Prague, CZ, Aug. 26-30, 2019, 19 pages.

* cited by examiner

APPARATUS AND METHOD FOR TRANSMITTING OR RECEIVING SIGNAL IN WIRELESS COMMUNICATION SYSTEM

CROSS-REFERENCE TO RELATED APPLICATIONS

This application is a 371 National Stage of International Application No. PCT/KR2020/013623, filed Oct. 7, 2020, which claims priority to Korean Patent Application No. 10-2019-0124184, filed Oct. 7, 2019, the disclosures of which are herein incorporated by reference in their entirety.

BACKGROUND

1. Field

The disclosure generally relates to a wireless communication system, and more particularly, to an apparatus and a method for transmitting or receiving signals in a wireless communication system.

2. Description of Related Art

Efforts to develop enhanced 5th generation (5G) communication systems or pre-5G communication systems have been ongoing in order to meet the increasing demand for wireless data traffic since 4th generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, advanced small cells, cloud radio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

As wireless communication systems such as 5G systems are developing, it is expected that various services are provided. Accordingly, there is a demand for a method for smoothly providing services.

SUMMARY

Based on the above-described discussion, the disclosure provides an apparatus and a method by which, when a terminal performs sidelink transmission and reception operations in a wireless communication system, the terminal determines which signal or which physical channel the terminal transmits or receives.

According to various embodiments of the disclosure, a method of a first terminal (user equipment (UE)) in a wireless communication system may include, when reception of a first physical sidelink feedback channel (PSFCH) regarding a first physical sidelink shared channel (PSSCH), and transmission of a second PSFCH regarding a second PSSCH overlap in a time domain, determining a PSFCH based on first sidelink control information (SCI) related to the first PSFCH and second SCI related to the second PSFCH, and transmitting or receiving feedback information through the determined PSFCH.

According to various embodiments, a first terminal (user equipment (UE)) in a wireless communication system may include: at least one transceiver; and at least one processor, and the at least one processor may be configured to, when reception of a first physical sidelink feedback channel (PSFCH) regarding a first physical sidelink shared channel (PSSCH), and transmission of a second PSFCH regarding a second PSSCH overlap in a time domain, determine a PSFCH based on first sidelink control information (SCI) related to the first PSFCH and second SCI related to the second PSFCH, and transmit or receive feedback information through the determined PSFCH.

According to various embodiments of the disclosure, a method of a first terminal (user equipment (UE)) in a wireless communication system may include, when transmission of a first physical sidelink feedback channel (PSFCH) regarding a first physical sidelink shared channel (PSSCH), and transmission of a second PSFCH regarding a second PSSCH overlap in a time domain, determining a PSFCH based on first sidelink control information (SCI) related to the first PSFCH and second SCI related to the second PSFCH, and transmitting feedback information through the determined PSFCH.

The apparatus and the method according to various embodiments of the disclosure clearly define operations of a terminal when communication between terminals is performed, thereby enabling frequency and time resources to be shared and used efficiently when communication between terminals is performed through a sidelink.

The effect achieved in the disclosure is not limited to those mentioned above, and other effects that are not mentioned above may be clearly understood to those skilled in the art based on the description provided below.

DETAILED DESCRIPTION

Figure 1:
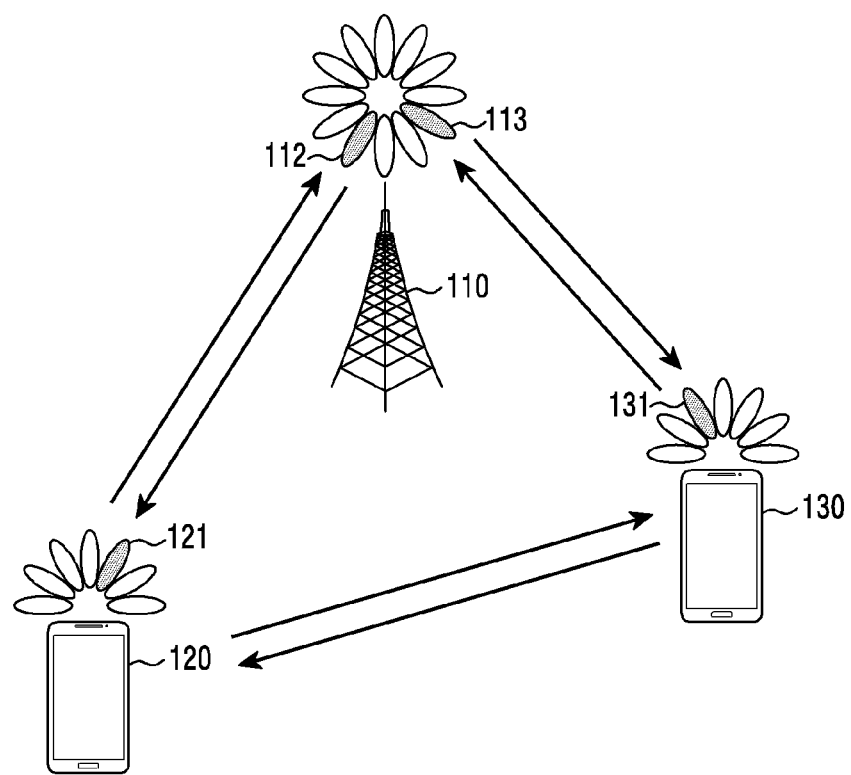
FIG. 1 is a view illustrating a wireless communication system according to various embodiments of the disclosure.

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to an apparatus and a method for transmitting or receiving signals in a wireless communication system. Specifically, the disclosure relates to an apparatus and a method for determining a signal according to a size of a priority in sidelink communication between terminals. In addition, the disclosure relates to an apparatus and a method regarding how to determine a signal when priorities are the same.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same technical meanings may be used.

In the following descriptions, a physical channel and a signal may be interchangeably used with data or a control signal. For example, a physical downlink shared channel (PDSCH) is a term indicating a physical channel through which data is transmitted, but the PDSCH may be used to indicate data. That is, in the disclosure, an expression 'transmitting a physical channel' may be interpreted as an expression 'transmitting data or a signal through a physical channel.'

In the disclosure, higher signaling refers to a signal transmission method for transmitting, by a base station, signals to a terminal by using a downlink data channel of a physical layer, or for transmitting, by a terminal, signals to a base station by using an uplink data channel of a physical layer. The higher signaling may be understood as radio resource control (RRC) signaling or a media access control (MAC) control element (CE).

In addition, in the disclosure, an expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

In addition, the disclosure describes various embodiments by using terms used in some communication standards (for example, 3rd generation partnership project (3GPP)), but these embodiments are merely examples. Various embodiments of the disclosure may be easily modified and applied to other communication systems.

FIG. 1 illustrates a wireless communication system according to various embodiments of the disclosure. FIG. 1 illustrates a base station 110, a terminal 120, and a terminal 130 as part of nodes using a wireless channel in a wireless communication system. FIG. 1 illustrates only one base station, but other base stations which are the same as or similar to the base station 110 may further be included.

The base station 110 is a network infrastructure that provides radio access to the terminals 120, 130. The base station 110 has a coverage that is defined as a predetermined geographical area based on a distance by which a signal can be transmitted. The base station 110 may be referred to as an "access point (AP)," "eNodeB (eNB)," "5th generation (5G) node," "next generation nodeB (gNB)," "wireless point," "transmission/reception point (TRP)," or other terms having the same technical meaning as the above-mentioned terms, in addition to the base station.

Each of the terminal 120 and the terminal 130 is a device which is used by a user, and may communicate with the base station 110 through a wireless channel. A link going from the base station 110 to the terminal 120 or the terminal 130 may be referred to as a downlink (DL), and a link going from the terminal 120 or the terminal 130 to the base station 110 may be referred to as uplink (UL). In addition, the terminal 120 and the terminal 130 may perform communication with each other through a wireless channel. In this case, a link between the terminal 120 and the terminal 130 (device-to-device link (D2D) may be referred to as a sidelink, and the sidelink may be interchangeably used with a PC5 interface. According to circumstances, at least one of the terminal 120 and the terminal 130 may be operated without user's intervention. That is, at least one of the terminal 120 and the terminal 130 is a device which performs machine type communication (MTC), and may not be carried by a user. Each of the terminal 120 and the terminal 130 may be referred to as "user equipment (UE)," "mobile station," "subscriber station," "remote terminal," "wireless terminal," or "user device," or other terms having the same technical meaning as the above-mentioned terms, in addition to the terminal.

The base station 110, the terminal 120, the terminal 130 may transmit and receive wireless signals in millimeter wave (mmWave) bands (for example, 28 GHz, 30 GHz, 38 GHz, 60 GHz). In this case, the base station 110, the terminal 120, the terminal 130 may perform beamforming to enhance a channel gain. Herein, beamforming may include transmission beamforming and reception beamforming. That is, the base station 110, the terminal 120, the terminal 130 may give directivity to a transmission signal or a reception signal. To achieve this, the base station 110 and the terminals 120, 130 may select serving beams 112, 113, 121, 131 through a beam search or beam management procedure. After the serving beams 112, 113, 121, 131 are selected, communication may be performed through resources that have a quasi co-located (QCL) relationship with resources which transmit the serving beams 112, 113, 121, 131.

As long as large-scale characteristics of a channel which transmits a symbol on a first antenna port can be inferred from a channel which transmits a symbol on a second antenna port, the first antenna port and the second antenna port may be evaluated as having a QCL relationship. For example, the large-scale characteristics may include at least one of delay spread, doppler spread, doppler shift, average gain, average delay, spatial receiver parameter.

In some embodiments, the terminal 120, the terminal 130 shown in FIG. 1 may support vehicle communication. In the case of vehicle communication, standardization regarding vehicle to everything (V2X) technology has been completed in 3GPP release 14 and release 15, based on a device-to-device (D2D) communication structure in LTE systems, and an effort to develop V2X technology based on 5G NR is ongoing. It is expected that, in NR V2X, unicast communication between terminals, groupcast (or multicast) communication, and broadcast communication are supported. In addition, NR V2X aims at providing more enhanced services such as platooning, advanced driving, extended sensor, remote driving, compared to LTE V2X which aims at transmitting and receiving basic safety information necessary for driving of a vehicle.

The V2X service may be divided into a basic safety service and an advanced service. The basic safety service may include a vehicle notification (cooperative awareness message (CAM) or basic safety message (BSM)) service as well as particular services such as a turn-left notification service, a rear-end collision warning service, an emergency vehicle approach notification service, a front obstacle warning service, an intersection signal information service, etc., and V2X information may be transmitted and received by using a broadcast, unicast, or groupcast transmission method. The advanced service more strengthens quality of service (QoS) requirements than the basic safety service, and also, requires a scheme for transmitting and receiving V2X information by using a unicast and groupcast transmission method, in addition to broadcast, so as to transmit and receive V2X information within a specific vehicle group or to transmit and receive V2X information between two vehicles. The advanced service may include particular services such as a platooning service, an automatic driving service, a remote driving service, an extended sensor-based V2X service, etc.

Figure 2:
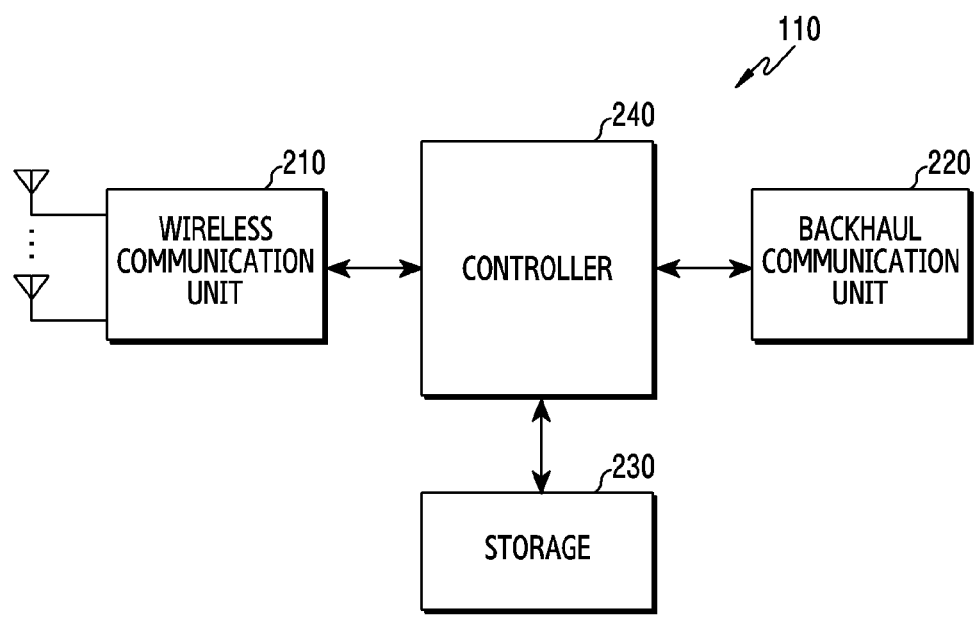
FIG. 2 is a view illustrating a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term "unit" or terms ending with suffixes "-er," and "-or" refer to a unit processing at least one function or operation, and may be implemented by hardware, software, or a combination of hardware and software.

Referring to FIG. 2, the base station may include a wireless communication unit 210, a backhaul communication unit 220, a storage 230, and a controller 240.

The wireless communication unit 210 performs functions for transmitting and receiving signals through a wireless channel. For example, the wireless communication unit 210 may perform a function of converting between a baseband signal and a bit stream according to a physical layer standard of a system. For example, when transmitting data, the wireless communication unit 210 may generate complex symbols by encoding and modulating a transmission bit stream. In addition, when receiving data, the wireless communication unit 210 may restore a reception bit stream by demodulating and decoding a baseband signal.

In addition, the wireless communication unit 210 may up-convert a baseband signal into a radio frequency (RF) band signal, and then may transmit the signal via an antenna, and may down-convert an RF band signal received via an antenna into a baseband signal. To achieve this, the wireless communication unit 210 may include a transmission filter, a reception filter, an amplifier, a mixer, an oscillator, a digital to analog converter (DAC), an analog to digital converter (ADC), or the like. In addition, the wireless communication unit 210 may include a plurality of transmission and reception paths. Furthermore, the wireless communication unit 210 may include at least one antenna array including a plurality of antenna elements.

In the hardware aspect, the wireless communication unit 210 may be configured by a digital unit and an analog unit, and the analog unit may be configured by a plurality of sub-units according to operating power, an operating frequency, or the like. The digital unit may be implemented by at least one processor (for example, a digital signal processor (DSP)).

The wireless communication unit 210 may transmit and receive signals as described above. Accordingly, an entirety or a part of the wireless communication unit 210 may be referred to as a "transmitter," "receiver," or "transceiver." In addition, in the following description, transmitting and receiving through a wireless channel may be used as a meaning including processing by the wireless communication unit 210 as described above.

The backhaul communication unit 220 provides an interface for communicating with the other nodes in the network. That is, the backhaul communication unit 220 may convert a bit stream to be transmitted from the base station to another node, for example, another access node, another base station, a higher node, a core network, or the like, into a physical signal, and may convert a physical signal transmitted from another node into a bit stream.

The storage 230 may store data such as a basic program for the operation of the base station, an application program, configuration information, or the like. The storage 230 may be configured by a volatile memory, a nonvolatile memory, or a combination of a volatile memory and a nonvolatile memory. In addition, the storage 230 provides stored data according to a request of the controller 240.

The controller 240 controls overall operations of the base station. For example, the controller 240 may transmit and receive signals via the wireless communication unit 210 or the backhaul communication unit 220. In addition, the controller 240 may write and read out data on and from the storage 230. In addition, the controller 240 may perform functions of a protocol stack required by communication standards. According to another implementation example, the protocol stack may be included in the wireless communication unit 210. To achieve this, the controller 240 may include at least one processor. According to various embodiments, the controller 240 may control the base station to perform operations according to various embodiments, which will be described below.

Figure 3:
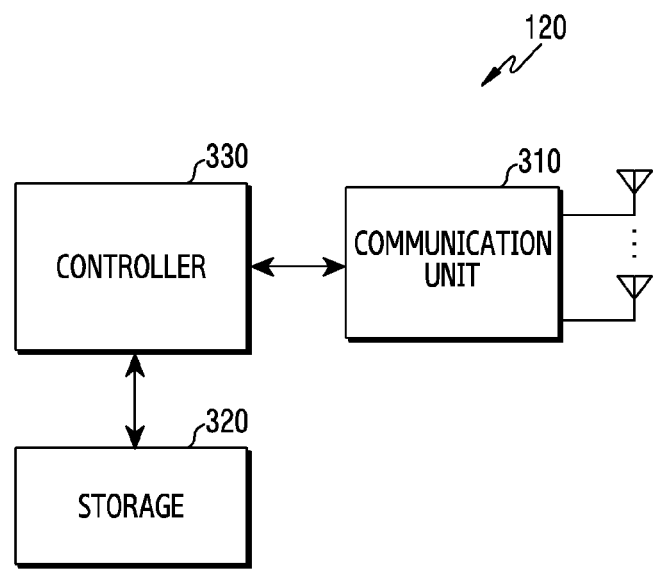
FIG. 3 is a view illustrating a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. The term "unit" or terms ending with suffixes "-er," and "-or" used in the following description refer to a unit processing at least one function or operation, and may be implemented by hardware, software, or a combination of hardware and software.

Referring to FIG. 3, the terminal may include a communication unit 310, a storage 320, and a controller 330.

The communication unit 310 performs functions for transmitting and receiving signals through a wireless channel. For example, the communication unit 310 may perform a function of converting between a baseband signal and a bit stream according to a physical layer standard of a system. For example, when transmitting data, the communication unit 310 may generate complex symbols by encoding and modulating a transmission bit stream. In addition, when receiving data, the communication unit 310 may restore a reception bit stream by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission and reception paths. Furthermore, the communication unit 310 may include at least one antenna array including a plurality of antenna elements. In the hardware aspect, the communication unit 310 may be configured by a digital circuit and an analog circuit (for example, a radio frequency integrated circuit (RFIC)). Herein, the digital circuit and the analogue circuit may be implemented as a single package. In addition, the communication unit 310 may include a plurality of RF chains. Furthermore, the communication unit 310 may perform beamforming.

The communication unit 310 may transmit and receive signals as described above. Accordingly, an entirety or part of the communication unit 310 may be referred to as a "transmitter," "receiver," or "transceiver." In addition, in the following descriptions, transmitting and receiving via a wireless channel may be used as a meaning including processing by the communication unit 310 as described above.

The storage 320 may store data such as a basic program for the operation of the terminal, an application program, configuration information, or the like. The storage 320 may be configured by a volatile memory, a nonvolatile memory, or a combination of a volatile memory and a nonvolatile memory. In addition, the storage 320 provides stored data according to a request of the controller 330.

The controller 330 controls overall operations of the terminal. For example, the controller 330 may transmit and receive signals via the communication unit 310. In addition, the controller 330 may write and read out data on and from the storage 320. In addition, the controller 330 may perform functions of a protocol stack required by communication standards. To achieve this, the controller 330 may include at least one processor or micro processor, or may be a part of a processor. In addition, a part of the communication unit 310 and the controller 330 may be referred to as a communication processor (CP). According to various embodiments, the controller 330 may control the terminal to perform operations according to various embodiments, which will be described below.

Figure 4:
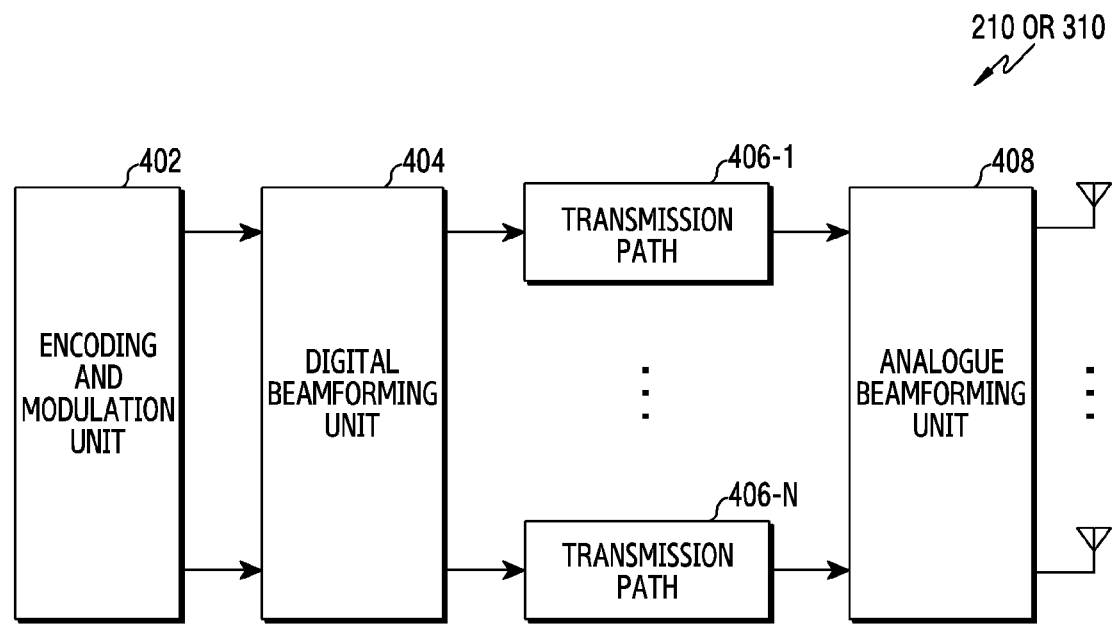
FIG. 4 is a view illustrating a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a detailed configuration of the wireless communication unit 210 of FIG. 2 or the wireless communication 310 of FIG. 3. Specifically, FIG. 4 illustrates components for performing beamforming as part of the wireless communication unit 210 of FIG. 2 or the communication unit 310 of FIG. 3.

Referring to FIG. 4, the wireless communication unit 210 or the communication unit 310 may include an encoding and modulation unit 402, a digital beamforming unit 404, a plurality of transmission paths 406-1 to 406-N, an analog beamforming unit 408.

The encoding and modulation unit 402 performs channel encoding. To perform channel encoding, at least one of a low density parity check (LDPC) code, a convolution code, a polar code may be used. The encoding and modulation unit 402 may generate modulation symbols by performing constellation mapping.

The digital beamforming unit 404 performs beamforming with respect to a digital signal (for example, modulation symbols). To achieve this, the digital beamforming unit 404 multiplies modulation symbols by beamforming weights. Herein, the beamforming weights may be used to change a size and a phase of a signal, and may be referred to as a "precoding matrix," "precoder." The digital beamforming unit 404 outputs digitally beamformed modulation symbols to the plurality of transmission paths 406-1 to 406-N. In this case, according to the multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert the digitally beamformed digital signals into analogue signals. To achieve this, each of the plurality of transmission paths 406-1 to 406-N may include an inverse fast Fourier transform (IFFT) calculation unit, a cyclic prefix (CP) insertion unit, a DAC, an up-conversion unit. The CP insertion unit is to perform orthogonal frequency division multiplexing (OFDM), and may be excluded when other physical layer methods (for example, a filter bank multi-carrier (FBMC)) are applied. That is, the plurality of transmission paths 406-1 to 406-N provide independent signal processing processes with respect to a plurality of streams generated through digital beamforming. However, some of the components of the plurality of transmission paths 406-1 to 406-N may be used in common according to an implementation method.

The analogue beamforming unit 408 performs beamforming with respect to an analogue signal. To achieve this, the analog beamforming unit 408 multiplies analogue signals by beamforming weights. Herein, the beamforming weights may be used to change a size and a phase of a signal. Specifically, the analogue beamforming unit 440 may be configured variously according to connection structures between the plurality of transmission paths 406-1 to 406-N and antennas. For example, each of the plurality of transmission paths 406-1 to 406-N may be connected with one antenna array. In another example, the plurality of transmission paths 406-1 to 406-N may be connected with one antenna array. In still another example, the plurality of transmission paths 406-1 to 406-N may be adaptively connected with one antenna array or may be connected with two or more antenna arrays.

Departing from their initial function of providing voice-oriented services, wireless communication systems are developing into broadband wireless communication systems that provide packet data services of high-speed, high quality, like communication standards such as high speed packet access (HSPA), long term evolution (LTE) or evolved universal terrestrial radio access (E-UTRA), LTE-advanced (LTE-A) of 3GPP, high rate packet data (HRPD), ultra mobile broadband (UMB) of 3GPP2, and 802.16e of IEEE. In addition, for 5th generation (5G) wireless communication systems, communication standards of 5G or new radio (NR) are being established.

An NR system may employ an orthogonal frequency division multiplexing (OFDM) scheme for a downlink (DL) and an uplink. More specifically, a cyclic-prefix OFDM (CP-OFDM) scheme may be employed in a downlink, and discrete Fourier transform spreading OFDM (DFT-S-OFDM) may be employed in an uplink, along with the CP-OFDM. The uplink refers to a radio link through which a terminal transmits data or a control signal to a base station, and the downlink refers to a radio link through which a base station transmits data or a control signal to a terminal. A multiple access scheme may typically divide data or control information of each user by allocating and managing the data or control information, such that time-frequency resources for carrying data or control information for each user do not overlap, that is, orthogonality is established.

The NR system employs a hybrid automatic repeat request (HARQ) scheme which, when decoding fails in initial transmission, retransmits corresponding data on a physical layer. According to the HARQ scheme, when a receiver does not exactly decode data, the receiver transmits negative acknowledgement (NACK), which is information indicating failure to decode, to a transmitter, thereby enabling the transmitter to retransmit corresponding data on a physical layer. The receiver may enhance data reception performance by combining the data retransmitted by the transmitter with previous data that the receiver has failed to decode. In addition, when the receiver exactly decodes data, the receiver transmits acknowledgement (ACK), which is information indicating success in decoding, to the transmitter, thereby enabling the transmitter to transmit new data.

Figure 5:
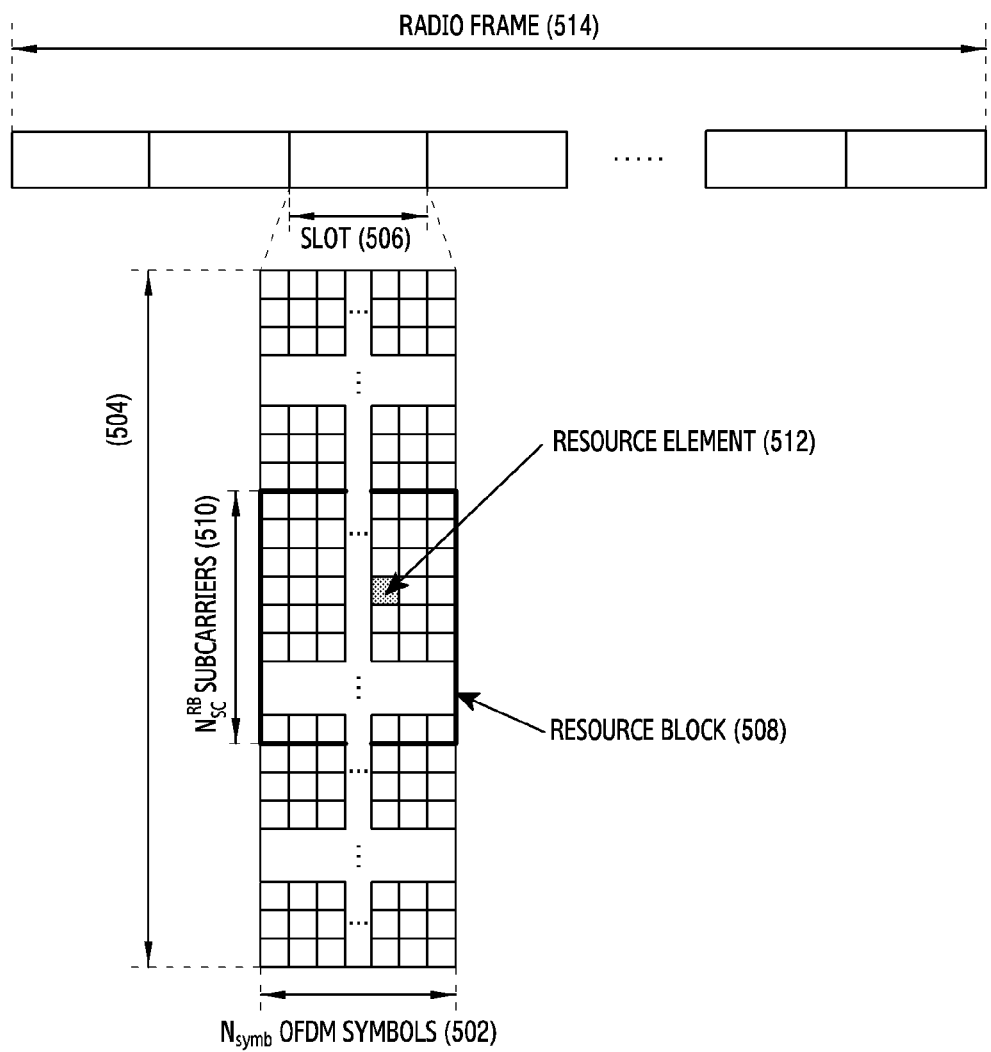
FIG. 5 is a view illustrating a resource structure of a time-frequency domain in a wireless communication system according to various embodiments of the disclosure.

FIG. 5 illustrates a resource structure of a time-frequency domain in a wireless communication system according to various embodiments of the disclosure. FIG. 5 illustrates a basic structure of a time-frequency domain which is a radio resource domain through which data or a control channel is transmitted in an uplink or downlink.

Referring to FIG. 5, the horizontal axis indicates a time domain and the vertical axis indicates a frequency domain. A minimum transmission unit in the time domain is an OFDM symbol, and Nsymb number of OFDM symbols 502 are collected, forming one slot 506. A length of a sub-frame may be defined as 1.0 ms, and a length of a radio frame 514 may be defined as 10 ms. A minimum transmission unit in the frequency domain is a subcarrier and a carrier bandwidth constituting a resource grid is formed of NBW number of subcarriers 504.

A basic unit of resources in the time-frequency domain is a resource element (hereinafter, 'RE') 512, and may be indicated by an OFDM symbol index and a subcarrier index. A resource block may include a plurality of resource elements. In an LTE system, a resource block (RB) (or a physical resource block (hereinafter, 'PRB')) is defined by Nsymb number of continuous OFDM symbols in the time domain and NSCRB number of continuous subcarriers in the frequency domain. In an NR system, the resource block (RB) 508 may be defined by NSCRB number of continuous subcarriers 510 in the frequency domain. One RB 508 includes NSCRB number of REs 512 on the frequency axis. In general, a minimum transmission unit of data is an RB and the number of subcarriers is NSCRB=12. The frequency domain may include common resource blocks (CRBs). In a bandwidth part (BWP) on the frequency domain, a physical resource block (PRB) may be defined. CRB and PRB numbers may be determined according to a subcarrier spacing. A data rate may increase in proportion to the number of RBs scheduled for a terminal.

In the NR system, in the case of a frequency division duplex (FDD) system which operates a downlink and an uplink by distinguishing frequencies, a downlink transmission bandwidth and an uplink transmission bandwidth may be different from each other. A channel bandwidth may indicate a radio frequency (RF) bandwidth corresponding to a system transmission bandwidth. [Table 1] indicates a part of corresponding relationship among the system transmission bandwidth, the subcarrier spacing (SCS), and the channel bandwidth, which are defined in the NR system in a frequency band (for example, frequency range (FR) 1 (410 MHz to 7125 MHz) lower than x GHz. In addition, [Table 2] indicates a part of corresponding relationship among the transmission bandwidth, the subcarrier spacing, and the channel bandwidth, which are defined in the NR system in a frequency band (for example, FR2 (24250 MHz to 52600 MHz) higher than y GHz. For example, in an NR system that has a 100 MHz channel bandwidth with a 30 kHz subcarrier spacing, a transmission bandwidth is formed of 273 RBs. In [Table 1] and [Table 2], N/A may be a bandwidth-subcarrier combination that is not supported in the NR system.

TABLE 1

| | | Channel Bandwidth [MHz] | | | | | |
|---|---|---|---|---|---|---|---|
| | SCS | 5 | 10 | 20 | 50 | 80 | 100 |
| Transmission | 15 kHz | 25 | 52 | 106 | 207 | N/A | N/A |
| Bandwidth | 30 kHz | 11 | 24 | 51 | 133 | 217 | 273 |
| Configuration $N_{RB}$ | 60 kHz | N/A | 11 | 24 | 65 | 107 | 135 |

TABLE 2

| Channel Bandwidth [MHz] | SCS | 50 | 100 | 200 | 400 |
|---|---|---|---|---|---|
| Transmission Bandwidth Configuration $N_{RB}$ | 60 kHz | 66 | 132 | 264 | N/A |
| | 120 kHz | 32 | 66 | 132 | 264 |

In the NR system, scheduling information regarding downlink data or uplink data is transmitted from a base station to a terminal through downlink control information (hereinafter, 'DCI'). The DCI is defined in various formats, and it may be determined whether DCI is an uplink grant which is scheduling information regarding uplink data or a downlink grant which is scheduling information regarding downlink data, whether DCI is compact DCI having control information of a small size, whether spatial multiplexing using multiple antennas is applied, whether DCI is DCI for controlling power, according to each format. For example, DCI format 1_1 which is scheduling control information regarding downlink data may include at least one of items described in [Table 3] presented below:

TABLE 3

| Items | Details |
|---|---|
| Carrier indicator | indicating which frequency carrier DCI is transmitted on |
| DCI format indicator | indicator identifying whether corresponding DCI is for an uplink or a downlink |
| BWP (bandwidth part) indicator | indicating in which BWP DCI is transmitted |
| Frequency domain resource assignment | indicating an RB of a frequency domain allocated to data transmission. A resource to be expressed is determined according to a system bandwidth and a resource allocation method. |
| Time domain resource assignment | indicating in which slot, in which OFDM symbol a data-related channel is transmitted |
| VRB-to-PRB mapping | indicating how a virtual RB (VRB) index and a physical RB (PRB) index are mapped |
| MCS (modulation and coding scheme) | indicating a modulation scheme used for data transmission and a coding rate, that is, indicating a coding rate value informing a TBS and channel coding information, along with information regarding whether the modulation scheme is QPSK, 16QAM, 64QAM, 256QAM |
| Code block group (CBG) transmission information | When CBG retransmission is set, indicating information regarding which CBG is transmitted |
| HARQ process number | indicating a process number of HARQ |
| NDI (new data indicator) | indicating whether transmission is HARQ initial transmission or retransmission |
| RV (redundancy version) | indicating a redundancy version of HARQ |
| TPC (transmit power control command) for PUCCH (physical uplink control channel) | indicating a transmit power control command regarding a PUCCH which is an uplink control channel |

In [Table 3], in the case of PDSCH transmission, the time domain resource assignment may be expressed by information regarding a slot in which a PDSCH is transmitted, a start symbol position S in the corresponding slot, and the number of symbols L onto which the PDSCH is mapped. Herein, S may be a relative position from the start of the slot, and L may be the number of continuous symbols, and S and L may be determined from start and length indicator values (SLIV) defined as shown in [Table 4] presented below:

TABLE 4 if (L−1)≤7 then
  SLIV=14·(L−1)+S
else
  SLIV=14·(14−L+11)+(14−1−S)
where 0<L≤14−S In an NR system, information regarding corresponding relationship among an SLIV value, a PDSCH or physical uplink shared channel (PUSCH) mapping type, and information regarding a slot in which the PDSCH or PUSCH is transmitted may be configured in one row through RRC configuration. Thereafter, by indicating an index value defined in the configured corresponding relationship by using the time domain resource assignment of DCI, a base station may transmit, to a terminal, the SLIV value, the PDSCH or PUSCH mapping type, information regarding the slot in which the PDSCH or PUSCH is transmitted.

In the case of the NR system, the PDSCH or PUSCH mapping type may include mapping types that are defined as a type A or a type B. In the case of the PDSCH or PUSCH mapping type A, a demodulation reference signal (DMRS) symbol starts from the second or third OFDM symbols in the slot. In the case of the PDSCH or PUSCH mapping type B, the DMRS symbol starts from the first OFDM symbol of a time domain resource allocated for PUSCH transmission.

The DCI may undergo channel coding and modulation and may be transmitted through a physical downlink control channel (PDCCH) which is a downlink control channel. The PDCCH may be used to indicate control information, not a channel. In general, the DCI is scrambled independently for each terminal by using a specific radio network temporary identifier (RNTI) or a terminal identifier, and is configured as an independent PDCCH after cyclic redundancy check (CRC) addition and channel coding, and is transmitted. The PDCCH is mapped onto a control resource set (CORESET) set for the terminal.

Downlink data may be transmitted through the PDSCH which is a physical channel for downlink data transmission. The PDSCH may be transmitted after a control channel transmission section, and scheduling information of a specific mapping position, a modulation scheme in a frequency domain may be indicated by the DCI which is transmitted through the PDCCH. Through the modulation and coding scheme (MCS) in the control information configuring the DCI, the base station notifies the terminal of a modulation scheme applied to the PDSCH to be transmitted, and a size of data to be transmitted (for example, a transport block size (TBS)). In an embodiment, the MCS may be configured with 5 bits or bits more than or less than 5 bits. The TBS refers to a size of data before channel coding for error correction is applied to a transport block (TB) which is data to be transmitted by the base station.

In the disclosure, the transport block (TB) may include a medium access control (MAC) header, a MAC CE, one or more MAC service data units (SDUs), padding bits. Alternatively, the TB may indicate a unit of data which descends from a MAC layer to a physical layer or a MAC protocol data unit (PDU).

Modulation schemes supported in the NR system may be quadrature phase shift keying (QPSK), 16 quadrature amplitude modulation (QAM), 64 QAM, and 256 QAM, and their respective modulation orders (Qm) may be 2, 4, 6, or 8. That is, in the case of QPSK, 2 bits may be transmitted per symbol, in the case of 16 QAM, 4 bits may be transmitted per symbol, in the case of 64 QAM, 6 bits may be transmitted per symbol, and in the case of 256 QAM, 8 bits may be transmitted per symbol. When 1024 QAM is supported, 10 bits may be mapped and transmitted per symbol of 1024 QAM.

Figure 6A:
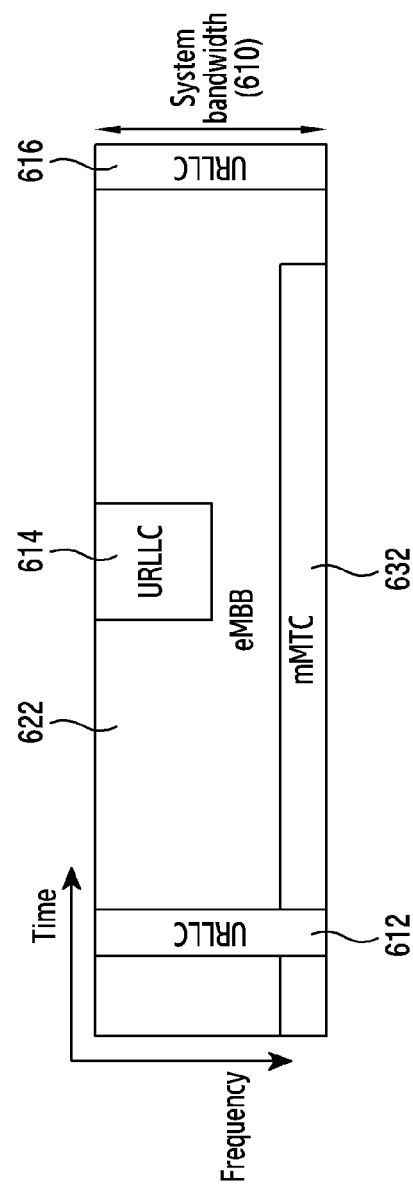
FIG. 6A is a view illustrating an example of allocation of data per service to frequency-time resources in a wireless communication system according to various embodiments of the disclosure.
Figure 6B:
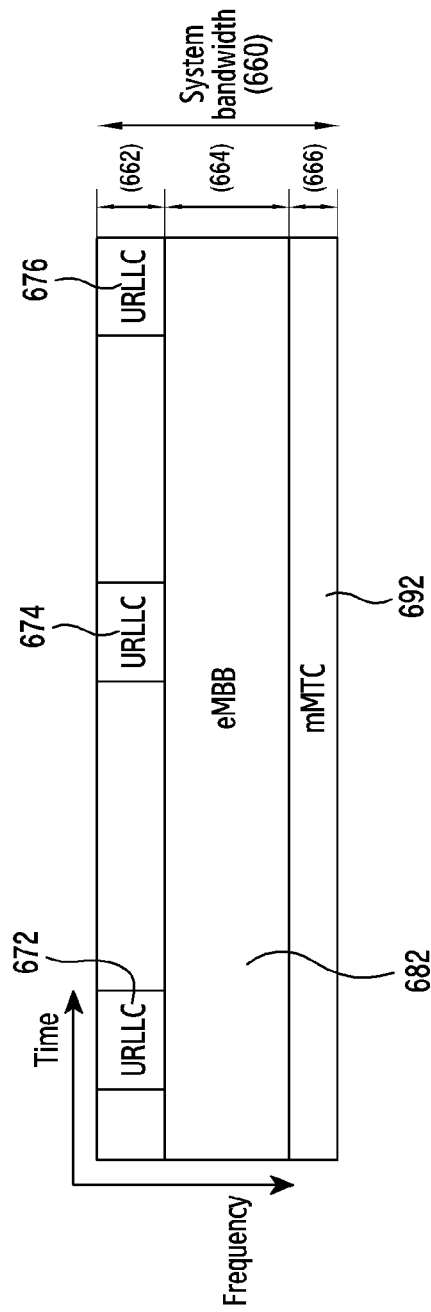
FIG. 6B is a view illustrating another example of allocation of data per service to frequency-time resources in a wireless communication system according to various embodiments of the disclosure.

The NR system may be designed to allow various services to be freely multiplexed in time and frequency resources in terms of services, and accordingly, waveform/numerology, reference signal, etc. may be dynamically or freely adjusted if necessary. In order to provide an optimal service to a terminal in wireless communication, it is important to transmit optimized data through measurement of quality of a channel and interference, and accordingly, it is essential to exactly measure a channel state. However, in the case of a 5G channel which is different from 4G communication in which channel and interference characteristics are not greatly changed according to frequency resources, channel and interference characteristics may be greatly changed according to services, and accordingly, it is necessary to support a subset by means of the frequency resource group (FRG) in order to separately measure channel and interference characteristics. Meanwhile, the NR system may divide types of services supported into enhanced mobile broadband (eMBB), massive machine type communications (mMTC), ultra-reliable and low-latency communications (URLLC). The eMBB is a service targeting at high-speed transmission of high-capacity data, the mMTC is a service targeting at minimizing terminal power and accessing by a plurality of terminals, the URLLC is a service targeting at high reliability and low latency. Different requirements may be applied according to a type of a service applied to a terminal. Examples of resource distribution of respective services are illustrated in FIGS. 6A and 6B. Referring to FIGS. 6A and 6B, a scheme for allocating frequency and time resources to transmit information in each system is described.

FIG. 6A illustrates an example of allocation of data per service in frequency-time resources in a wireless communication system according to various embodiments of the disclosure. In FIG. 6A, in a system frequency band 610, resources may be allocated to eMBB 622, URLLC 612, 614, 616, and mMTC 632. When URLLC 612, 614, 616 data is generated while eMBB 622 data and mMTC 632 data are allocated in a specific frequency band and are transmitted, portions already allocated to eMBB 622 and mMTC 632 may be emptied, or data may not be transmitted and URLLC 612, 614, 616 data may be transmitted (for example, pre-emption). Since URLLC requires reduction of a latency time, resources for transmitting the URLLC 612, 614, 616 data may be allocated to a part of resources allocated to eMBB 622. When URLLC 612, 614, 616 is additionally allocated resources which are allocated to eMBB 622, and is transmitted, the eMBB 622 data may not be transmitted in overlapping frequency-time resources, and accordingly, transmission performance of the eMBB 622 data may be degraded. That is, in the above-described case, there may be failure to transmit the eMBB 622 data due to allocation of resources to the URLLC 612, 614, 616. The scheme shown in FIG. 6A may be referred to as a preemption scheme.

FIG. 6B illustrates another example of allocation of data per service in frequency-time resources in a wireless communication system according to various embodiments of the disclosure. FIG. 6B illustrates that respective services are provided in respective sub-bands 662, 664, 666 divided from a whole system frequency band 660. Specifically, the sub-band 662 is used to transmit URLLC 672, 674, 676 data, the sub-band 664 is used to transmit eMBB 682 data, and the sub-band 666 is used to transmit mMTC 692 data. Information related to configuration of the sub-bands 662, 664, 666 may be pre-determined, and the information may be transmitted from a base station to a terminal through higher signaling. Alternatively, information related to the sub-bands 662, 664, 666 may be arbitrarily divided by a base station or a network node, and services may be provided without transmitting separate sub-band configuration information to the terminal.

According to various embodiments, a length of a transmission time interval (TTI) used for transmission of URLLC may be shorter than a length of a TTI used for transmission of eMBB or mMTC. In addition, a response to the information related to the URLLC may be transmitted faster than that of eMBB or mMTC, and accordingly, a terminal using the URLLC service may transmit and receive information with low latency. Structures of physical layer channels used for the respective types in order to transmit the above-described 3 types of services or data may be different from one another. For example, at least one of a length of a TTI, an allocation unit of frequency resources, a structure of a control channel, a data mapping method may be different.

Although three types of services and three types of data have been described, more types of services and corresponding data types may exist. In this case, various embodiments described below may be implemented.

Figure 7:
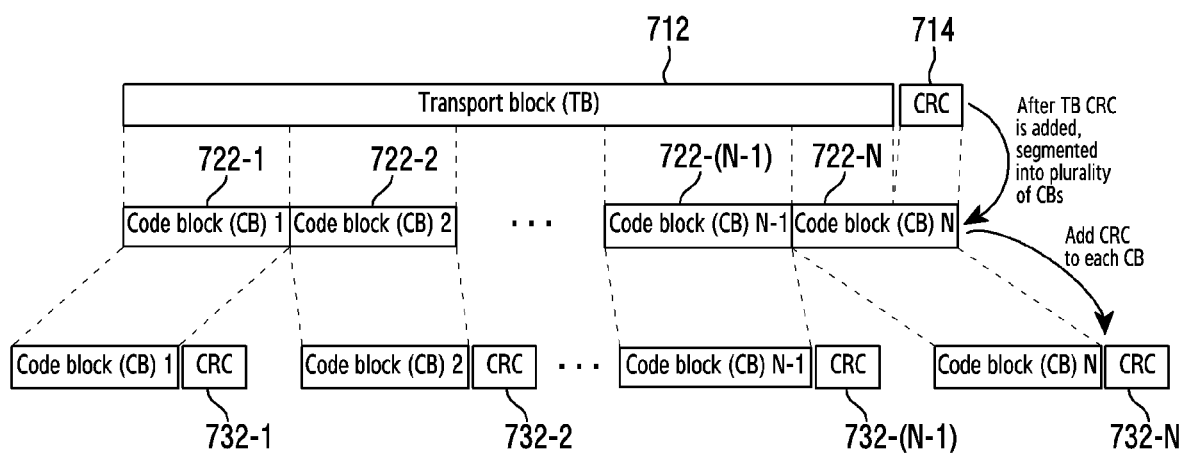
FIG. 7 is a view illustrating an encoding scheme of data in a wireless communication system according to various embodiments of the disclosure.

FIG. 7 illustrates a method for encoding data in a wireless communication system according to various embodiments of the disclosure. FIG. 7 illustrates that one transport block (TB) is segmented into a plurality of code blocks (CBs) and a cyclical redundancy check (CRC) is added.

Referring to FIG. 7, a CRC 714 may be added to a rear end or a front end of one TB 712 to be transmitted in an uplink or a downlink. The CRC 714 may have 16 bits or 24 bits or a pre-fixed number of bits, or may have a variable number of bits according to a channel situation, and may be used to determine whether channel coding succeeds at a receiver. The TB 712 and the block to which the CRC 714 is added may be segmented into a plurality of CBs 722-1, 722-2, 722-(N−1), 722-N). The block may be segmented into CBs of a predetermined size. In this case, the last CB 722-N may be smaller than the other CBs, or may be configured to have the same length as those of the other CBs by adding 0, a random value, or 1. CRCs 732-1, 732-2, 732-(N−1), 732-N may be added to the segmented CBs, respectively. The CRCs 732-1, 732-2, 732-(N−1), 732-N may have 16 bits or 24 bits or a pre-fixed number of bits, and may be used to determine whether channel coding succeeds at the receiver.

In order to generate the CRC 714, the TB 712 and a cyclic generator polynomial may be used. The cyclic generator polynomial may be variously defined. For example, on the assumption that a cyclic generator polynomial for 24-bit CRC is gCRC24A(D)=D24+D23+D18+D17+D14+D11+D10+D7+D6+D5+D4+D3+D+1, if L=24, CRC p1, p2, . . . , pL−1 regarding TB data a0, a1, a2, a3, . . . , aA−1 may be determined to be a value that has the remainder of 0 when a0DA+23+a1DA+22+ . . . +aA-1D24+p0D23+p1D22+ . . . +p22D1+p23 is divided by gCRC24A(D). In the above-described example, it is illustrated that the CRC length L is 24, but the length L may be defined differently like 12, 16, 24, 32, 40, 48, 64, etc.

As described above, after the CRC is added to the TB, the sum of the TB and the CRC is segmented into N number of CBs 722-1, 722-2, 722-(N−1), 722-N. CRCs 732-1, 732-2, 732-(N−1), 732-N are added to the CBs 722-1, 722-2, 722-(N−1), 722-N, respectively. The CRC added to each CB may be a CRC of a different length from that when the CRC added to the TB is generated, or may be generated based on other cyclic generator polynomials. However, according to another embodiment, the CRC 714 added to the TB and the CRCs 732-1, 732-2, 732-(N−1), 732-N added to the CBs 722-1, 722-2, 722-(N−1), 722-N may be omitted according to a type of a channel code to be applied to the CB. For example, when a low density parity code (LDPC) other than a turbo code is applied to the CB, the CRCs 732-1, 732-2, 732-(N−1), 732-N added to every CB may be omitted. However, even when the LDPC is applied, the CRCs 732-1, 732-2, 732-(N−1), 732-N may be added to the CBs 732-1, 732-2, 732-(N−1), 732-N. In addition, even when a polar code is used, the CRC may be added or may be omitted.

As shown in FIG. 7, a maximum length of one CB of the TB may be determined according to a type of channel coding applied, and the TB and the CRC added to the TB may be segmented into CBs according to the maximum length of the CB. In a related-art LTE system, a CRC for a CB may be added to the segmented CB, and data bits and a CRC of the CB may be encoded into a channel code, and accordingly, coded bits are determined, and the number of bits rate-matching the respective coded bits may be determined as promised.

Figure 8:
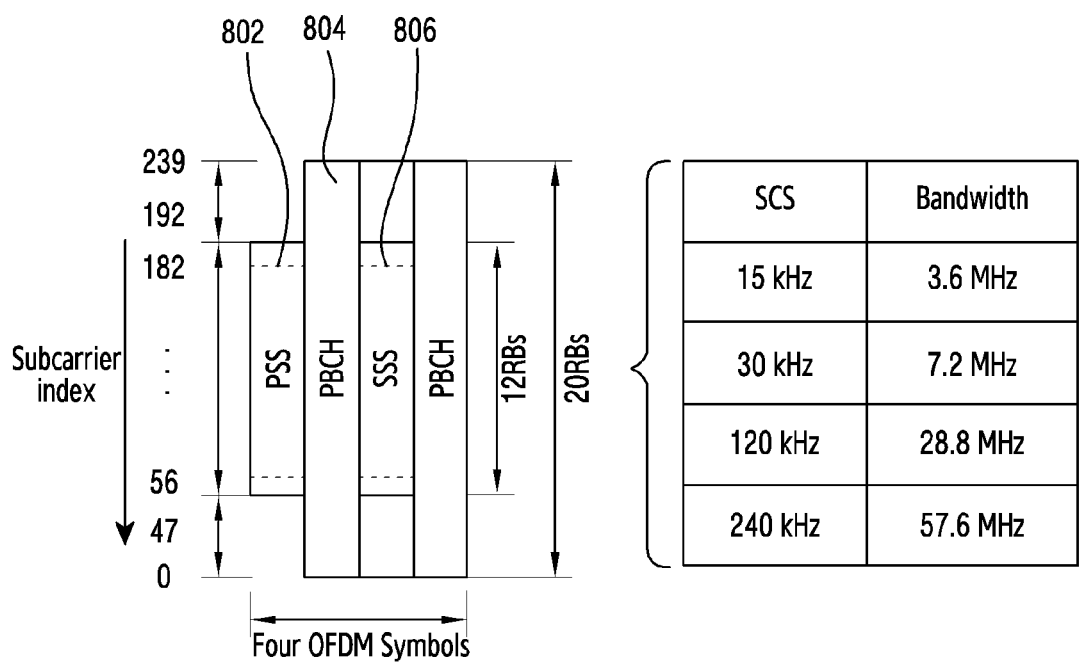
FIG. 8 is a view illustrating mapping of a synchronization signal and a broadcast channel in a wireless communication system according to various embodiments of the disclosure.

FIG. 8 illustrates mapping between a synchronization signal and a broadcast channel in a wireless communication system according to various embodiments of the disclosure. FIG. 8 illustrates an example of a result of mapping synchronization signal and physical broadcast channels (PBCH) of a 3GPP NR system in frequency and time domains.

Referring to FIG. 8, a primary synchronization signal (PSS) 802, a secondary synchronization signal (SSS) 806, and a PBCH 804 are mapped over four OFDM symbols, and the PSS 802 and the SSS 806 are mapped onto 12 RBs and the PBCH 804 is mapped onto 20 RBs. Frequency bands of 20 RBs according to subcarrier spacings (SCS) are illustrated in FIG. 8. A set of the PSS 802, the SSS 806, the PBCH 804, or a resource domain for transmitting the PSS 802, the SSS 806, the PBCH 804 may be referred to as an SS/PBCH block (SSB).

Figure 9:
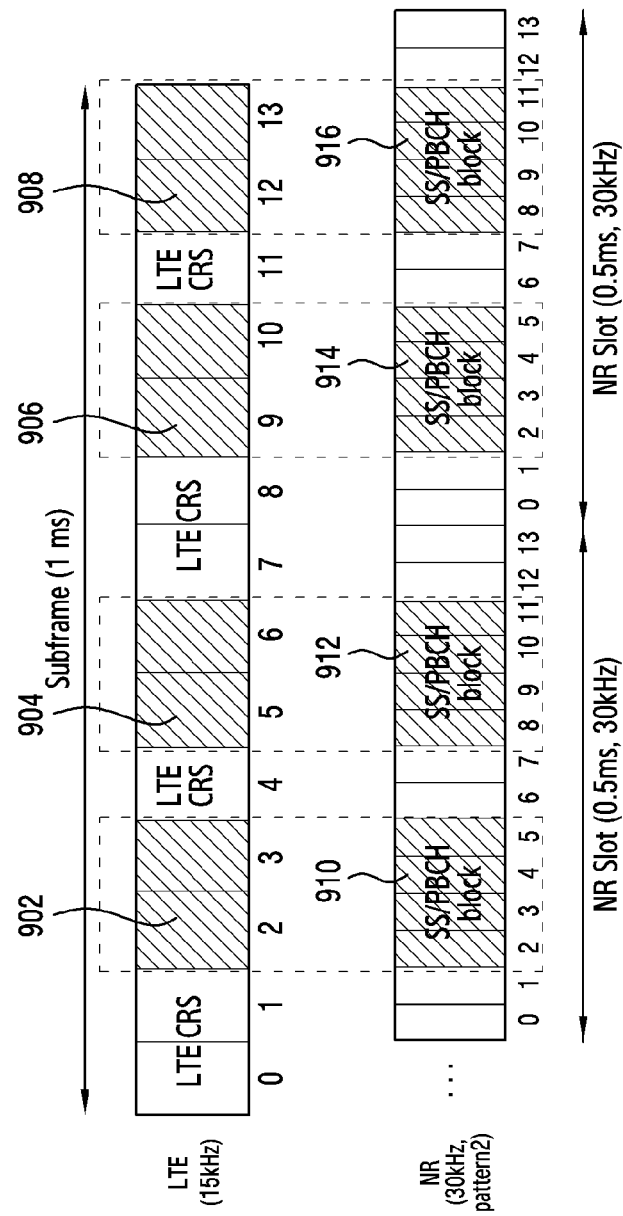
FIG. 9 is a view illustrating an example of arrangement of a synchronization signal/physical broadcast channel block (SSB) in a wireless communication system according to various embodiments of the disclosure.

FIG. 9 illustrates an example of arrangement of SSBs in a wireless communication system according to various embodiments of the disclosure. FIG. 9 illustrates which symbols one SSB is mapped onto in a slot, and illustrates examples of an LTE system which uses a subcarrier spacing of 15 kHz, and an NR system which uses a subcarrier spacing of 30 kHz.

Referring to FIG. 9, SSBs 910, 912, 914, 916 of the NR system are transmitted on positions 902, 904, 906, 908 which do not overlap cell-specific reference signals (CRSs) which are always transmitted in the LTE system. The design of FIG. 9 is for the LTE system and the NR system to coexist in one frequency band.

Figure 10A:
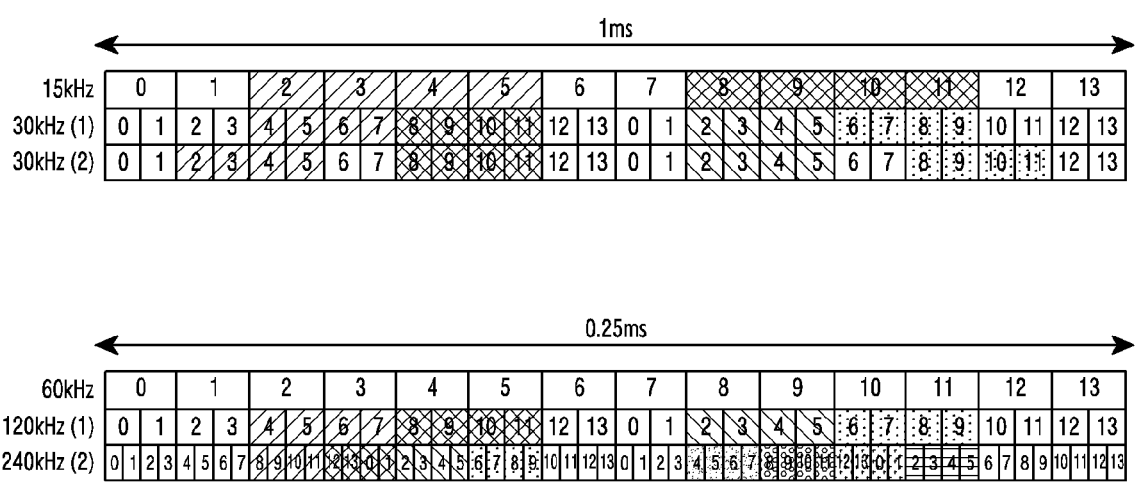
FIGS. 10A and 10B are views illustrating positions of transmittable symbols of an SSB according to a subcarrier spacing in a wireless communication system according to various embodiments of the disclosure.
Figure 10B:
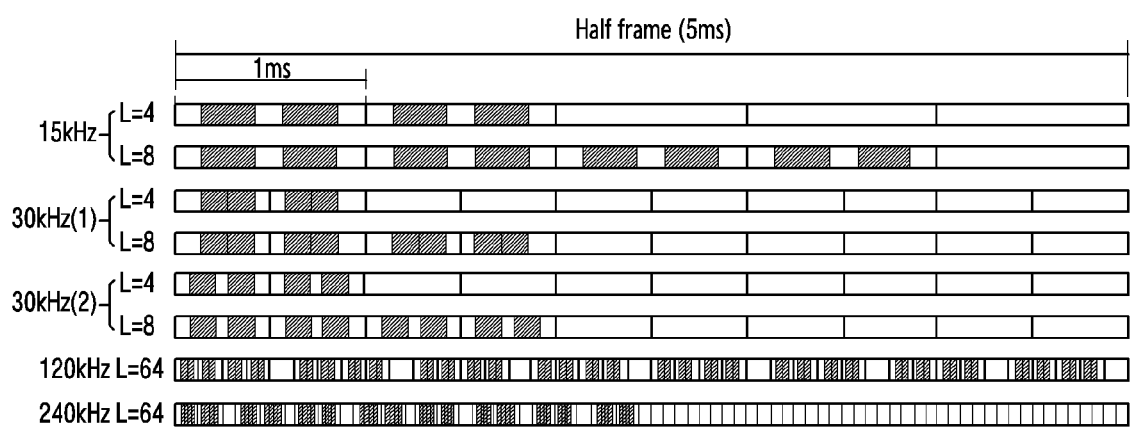

FIGS. 10A and 10B illustrate transmissible symbol positions of an SSB according to a subcarrier spacing in a wireless communication system according to various embodiments of the disclosure. FIG. 10A illustrates positions of symbols in which the SSB is transmittable within a period of 1 ms, and FIG. 10B illustrates positions of symbols in which the SSB is transmittable within a period of 5 ms (half-frame). In a region where the SSB is transmittable as shown in FIGS. 10A and 10B, the SSB is not always transmitted and the SSB may be transmitted or may not be transmitted according to selection of a base station.

In a wireless communication system according to various embodiments, a size of a TB may be calculated through the following steps:

Step 1: The number of REs allocated to PDSCH mapping in one RPB within an allocated resource, NRE', is calculated. NRE' is calculated by $N'_E = N_{sc}^{RB} \cdot N_{symb}^{sh} - N_{DRMS}^{PRB} - N_{oh}^{PRB}$. Herein, $NR_{sc}^{RB}$ is the number of subcarriers included in one RB (for example, 12), $N_{symb}^{sh}$ is the number of OFDM symbols allocated to a PDSCH in a slot, $N_{DRMS}^{PRB}$ is the number of REs in one PRB that are occupied by a demodulation reference signal (DMRS) of the same code division multiplexing (CDM) group, and $N_{oh}^{PRB}$ is the number of REs (for example, set to one of 0, 6, 12, 18) occupied by an overhead in one PRB configured by higher signaling. Thereafter, the total number of REs (NRE) allocated to the PDSCH within the slot may be calculated. NRE is calculated by $N_{RE} = \min(156, N_{RE}') \cdot n_{PRB} \cdot n_{PRB}$ is the number of PRBs allocated to a terminal.

Step 2: The number of temporary information bits, Ninfo, may be calculated by $N_{info} = N_{RE} \cdot R \cdot Q_m \cdot v$. Herein, R is a code rate, $Q_m$ is a modulation order, and v is the number of allocated layers. The code rate and the modulation order may be delivered by using a pre-defined corresponding relationship with an MCS field included in control information. If $N_{info} \leq 3824$, the TBS may be calculated according to step 3, and if not, the TBS may be calculated according to step 4.

Step 3: $N'_{info}$ may be calculated by $$N'_{info} = \max(24, 2^n \cdot \left\lfloor \frac{N_{info}}{2^n} \right\rfloor) \text{ and } n = \max(3, \lfloor \log_2(N_{info}) \rfloor - 6).$$

Subsequently, the TBS may be determined to be a value closest to $N'_{info}$ among values that are not smaller than $N'_{info}$ in [Table 5] presented below:

TABLE 5

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N'_{info}$ may be calculated according to $$N'_{info} = \max(3840, 2^n \times \text{round}\left(\frac{N_{info} - 24}{2^n}\right)) \text{ and } n = \lfloor \log_2(N_{info} - 24) \rfloor - 5.$$

Subsequently the TBS may be determined through $N'_{info}$ and pseudocode shown in [Table 6] presented below:

TABLE 6

If $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
   if $N'_{info} > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if

If one CB is inputted into an LDPC encoder, parity bits may be added and may be outputted. In this case, the quantity (size) of parity bits may vary according to an LDPC base graph. According to a rate matching scheme, all parity bits generated by LDPC coding may be transmittable or only some of them may be transmittable. A scheme for processing all parity bits generated by LDPC coding to be transmittable is referred to as 'full buffer rate matching (FBRM)', and a scheme for limiting the number of transmittable parity bits is referred to as 'limited buffer rate matching (LBRM)'. If resources are allocated for data transmission, an output of the LDPC encoder is inputted to a circular buffer, and bits of the buffer are transmitted repeatedly as many times as the allocated resources.

If the length of the circular buffer is Ncb and the number of all parity bits generated by LDPC coding is N, Ncb=N in the case of the FBRM scheme. In the case of the LBRM scheme, $$N_{cb} = \min(N, N_{ref}), N_{ref} = \left\lfloor \frac{TBS_{LBRM}}{C \cdot R_{LBRM}} \right\rfloor,$$

RLBRM may be determined as ⅔. The above-described scheme for determining the TBS may be used to determine TBSLBRM. In this case, C is the number of real code blocks of the TB which is scheduled. In this case, the number of layers may be assumed to be the maximum number of layers that a terminal supports in a corresponding cell, and the modulation order may be set to a maximum modulation order set for the terminal in the corresponding cell, or, if the modulation order is not set, the modulation order may be assumed to be 64-QAM, a code rate may be assumed to be a maximum code rate of 948/1024, NRE may be assumed to be NRE=156·nPRB, and nPRB may be assumed to be nPRB=nPRB,LBRM. nPRB,LBRM may be defined as shown in [Table 7] presented below:

TABLE 7

| Maximum number of PRBs across all configured BWPs of a carrier | $n_{PRB, LBRM}$ |
| --- | --- |
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In a wireless communication system according to various embodiments, the maximum data rate supported by a terminal may be determined through Equation 1 presented below:

Equation 1 data rate (in *Mbps*) =

$$10^{-6} \cdot \sum_{j=1}^{J\Sigma} \left( v_{Layers}^{(j)} \cdot Q_m^{(j)} \cdot f^{(j)} \cdot R \frac{N_{PRB}^{BW(j),\mu} \cdot 12}{T_S^{\mu}} (1 - OH^{(j)})_{max} () \right)$$

In [Equation 1], J is the number of carriers that are gathered by carrier aggregation (CA), Rmax=948/1024, $v_{Layers}^{(j)}$ is the maximum number of layers of a carrier of index j, $Q_m^{(j)}$ is a maximum modulation order of the carrier of the index j, f(j) is a scaling coefficient of the carrier of the index j, and μ is a subcarrier spacing (SCS). f(j) is one of values 1, 0.8, 0.75, 0.4 and may be reported by a terminal. μ may be given as shown in [Table 8] presented below:

TABLE 8

| μ | $\Delta f = 2^\mu \cdot 15[kHz]$ | Cyclic Prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Herein, $T_s^\mu$ is an average OFDM symbol length and may be calculated by $$T_s^\mu = \frac{10^{-3}}{14 \cdot 2^\mu}, \text{ and } N_{PRB}^{BW(j),\mu}$$

is the maximum number of RBs in $BW^{(j)}$. $OH^{(j)}$ is an overhead value and may be given 0.14 in a downlink of FR1 (for example, a band less than or equal to 6 GHz or 7.125 GHz) and 0.18 in an uplink, and may be given 0.08 in a downlink of FR2 (for example, a band exceeding 6 GHz or 7.125 GHz) and 0.10 in an uplink. According to [Equation 1], a maximum data rate in a downlink in a cell having a 100 MHz frequency band width at a subcarrier spacing of 30 kHz may be calculated as shown in [Table 9] presented below:

TABLE 9

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | Data rate |
| --- | --- | --- | --- | --- | --- | --- | --- |
| 1 | 4 | 8 | 0.92578125 | 273 | 3.57143E–05 | 0.14 | 2337.0 |
| 0.8 | 4 | 8 | 0.92578125 | 273 | 3.57143E–05 | 0.14 | 1869.6 |
| 0.75 | 4 | 8 | 0.92578125 | 273 | 3.57143E–05 | 0.14 | 1752.8 |
| 0.4 | 4 | 8 | 0.92578125 | 273 | 3.57143E–05 | 0.14 | 934.8 |

On the other hand, a real data rate that is measured by a terminal in real data transmission may be a data quantity divided by a data transmission time. This may be a sum of TB sizes (TBSs) in 1 TB transmission or a sum of TBSs in 2 TB transmission divided by a TTI length. For example, a maximum real data rate in a downlink in a cell having a 100 MHz frequency band width at a subcarrier spacing of 30 kHz may be defined according to the number of allocated PDSCH symbols as shown in [Table 10] presented below:

TABLE 10

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | Data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 3,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,227,992 | 0.500000 | 2,555.98 |

The maximum data rate that is supported by a terminal may be identified through [Table 9], and a real data rate according to an allocated TBS may be identified through [Table 10]. In this case, the real data rate may be greater than the maximum data rate according to scheduling information.

In a wireless communication system, particularly, in an NR system, a data rate that is supported by a terminal may be promised between a base station and a terminal. The data rate may be calculated by using a maximum frequency band, a maximum modulation order, a maximum number of layers which are supported by the terminal. However, the calculated data rate may be different from a value that is calculated based on a size of a TB (transport block size (TBS)) which is used for real data transmission, and a transmission time interval (TTI) length. Accordingly, the terminal may be allocated a TBS larger than a value corresponding to the data rate that is supported by the terminal, and in order to prevent this, there may be a limit to the TB S that may be scheduled according to the data rate supported by the terminal. It may be necessary to minimize this case and to define an operation of the terminal in this case. In addition, when LBRM is applied in a communication system currently defined in the NR, TB SLBRM is determined based on the number of layers supported by the terminal, or a rank. However, the process of determining may be inefficient or a parameter configuration may be vague, and accordingly, there is a problem that it is difficult to stably apply the LBRM at a base station or terminal. Hereinafter, the disclosure describes various embodiments to solve the problems.

Figure 11:
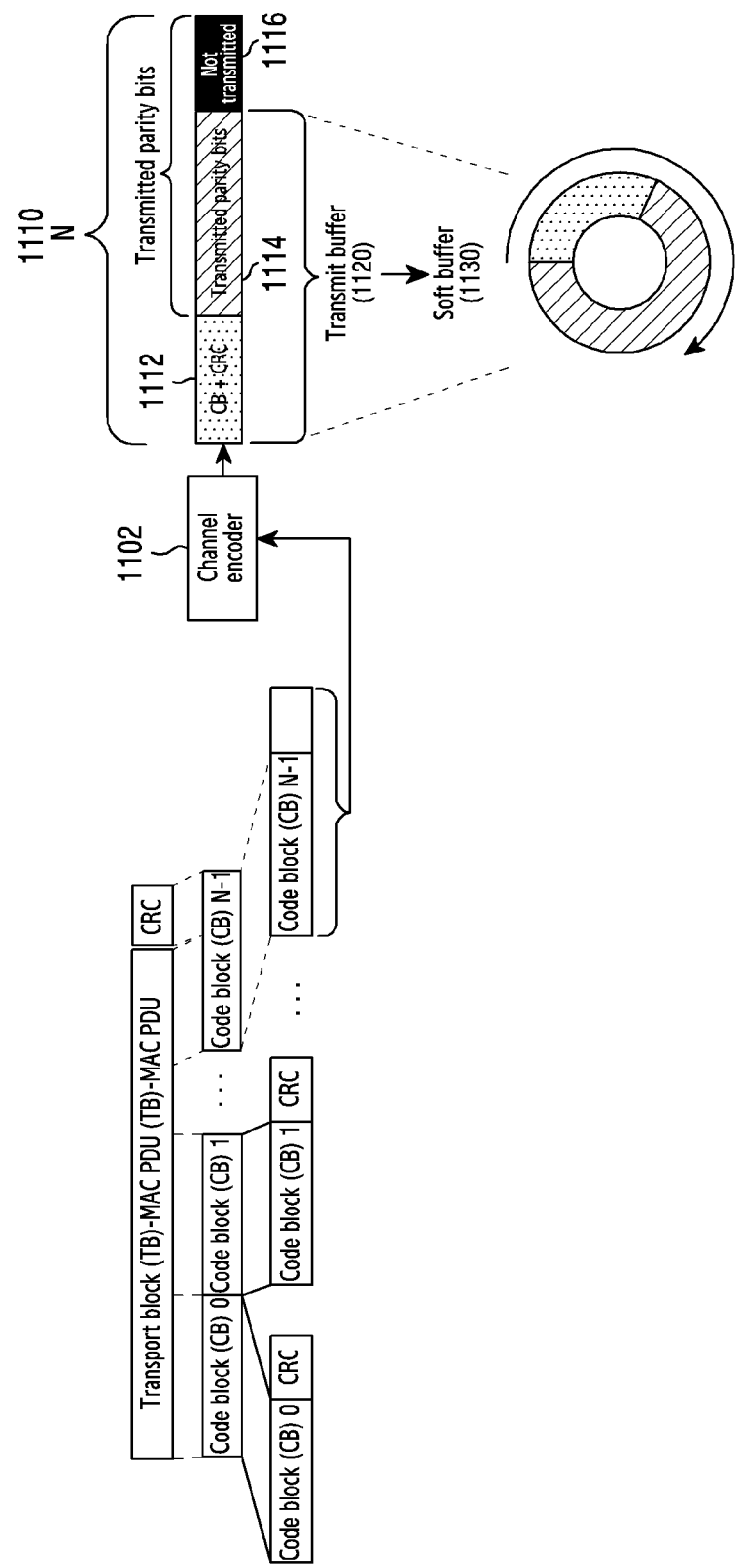
FIG. 11 is a view illustrating an example of generation and transmission of parity bits in a wireless communication system according to various embodiments of the disclosure.

FIG. 11 illustrates an example of generation and transmission of parity bits in a wireless communication system. FIG. 11 illustrates an example of a process of segmenting data to be transmitted into code blocks (CBs), generating parity bits by applying channel coding to the segmented CB, and determining parity bits to transmit and transmitting the parity bits.

Referring to FIG. 11, one CB is transmitted to a channel encoder 1102 and data bits 1112 and parity bits 1114, 1116 are generated by the channel encoder 1102. For example, the channel encoder 1102 may perform encoding by using an LDPC, a polar code, or other channel codes. In this case, the quantity of generated parity bits may vary according to a type of a channel code and details. If the total length of the bits 1110 generated by encoding of the channel encoder 1102 is N bits, when all parity bits 1114 and 1116 are transmitted, a soft buffer or a memory for storing reception information of N bits may be required at a receiver. If the receiver uses a soft buffer of a size smaller than N bits, reception performance may be degraded.

In order to reduce the size of the soft buffer required, a scheme for determining parity bits 1116 that are not transmitted, and for preventing the determined parity bits 1116 from being transmitted may be used. That is, only the data bits 1112 and some 1114 of the parity bits may be inputted to a transmit buffer 1120, and may be transmitted to a soft buffer 1130, thereby being transmitted. That is, there may be a limit to transmissible parity bits and the limited quantity of transmissible parity bits is a sum of the size of the data bits 1112 and the size of some 1114 of the parity bits, and may be indicated by Ncb. If Ncb is N, it means that the transmittable parity bits are not limited, and indicates that all parities generated as channel codes are transmitted. A scheme for processing all parity bits to be transmittable may be referred to as full buffer rate matching (FBRM). On the other hand, if Ncb is determined as Ncb=min(N, Nref) and $$N_{ref}N_{ref} = \left\lfloor \frac{TBS_{LBRM}}{C \cdot R_{LBRM}} \right\rfloor,$$

the transmittable parity bits may be limited. As described above, the scheme for limiting the number of transmittable parity bits may be referred to as 'limited buffer rate matching (LBRM)'.

In embodiments described below, a base station is an entity that performs resource allocation of a terminal, and may be a base station supporting both V2X communication and normal cellular communication or a base station supporting only V2X communication. That is, the base station may refer to an NR base station (for example, gNB), an LTE base station (for example, eNB), or a road site unit (RSU), or a fixed station. A terminal may be one of normal user equipment (UE), a mobile station, a vehicle supporting vehicular-to-vehicular communication (V2V), a vehicle supporting vehicular-to-pedestrian communication (V2P) or a handset of a pedestrian (for example, a smartphone), a vehicle supporting vehicular-to-network communication (V2N), a vehicle supporting vehicular-to-infrastructure communication (V2I), an RSU provided with a terminal function, an RSU provided with a base station function, or an RSU provided with some of the base functions and some of the terminal function.

In a V2X environment, data may be transmitted from one terminal to a plurality of terminals, or data may be transmitted from one terminal to one terminal. Alternatively, data may be transmitted from a base station to a plurality of terminals. However, the disclosure is not limited thereto and may be applied to various cases.

A terminal in a side link operates based on a resource pool which is already defined or set or pre-set between terminals in order to transmit and receive. The resource pool may be a set of frequency and time domain resources which are used to transmit and receive sidelink signals. That is, sidelink signals should be transmitted and received in frequency-domain resources pre-defined for transmitting and receiving sidelink signals. Such resources may be defined as the resource pool. The resource pool may be defined for transmission and reception, respectively, or may be defined in common for transmission and reception and may be used. In addition, terminals may receive setting of one or a plurality of resource pools and may perform an operation of transmitting and receiving sidelink signals. Configuration information regarding the resource pool used for sidelink transmission and reception, and other configuration information for the sidelink may be pre-installed when the terminals are produced, may be configured from a current base station, may be pre-configured from another base station or another network unit before the terminal connects to the current base station, may have a fixed value, may be provisioned from a network or may be self-constructed by the termina itself.

In order to indicate a frequency domain resource of the resource pool, the base station may indicate a start index and a length (for example, the number of PRBs) of an PRB belonging to the resource pool, but this should not be considered as limiting. One resource pool may be configured by indicating PRBs by using a bitmap. In addition, in order to indicate a time domain resource of the resource pool, the base station may indicate indexes of OFDM symbols or slots belonging to the resource pool in the unit of bitmap. Alternatively, according to other methods, a system may use an equation in a set of specific slots, and may define slots that satisfy the corresponding equation as belonging to the corresponding resource pool. When setting time domain resources, the base station may inform which slots belong to the specific resource pool among slots of a specific time duration by using the bit map, and in this case, it may be indicated whether the slots correspond to the resource pool of the time resource at every specific time, according to the bitmap.

On the other hand, a sub channel may be defined as a resource unit on a frequency including a plurality of RBs. In other words, the sub channel may be defined as an integer multiple of the RB. A size of the sub channel may be the same or may be differently set, and one sub channel is generally comprised of continuous PRBs, but one sub channel is not necessarily comprised of continuous PRBs. The sub channel may be a basic unit for resource allocation regarding a physical sidelink shared channel (PSSCH) or a physical sidelink control channel (PSCCH). Accordingly, the size of the sub channel may be differently set according to whether a corresponding channel is the PSSCH or the PSCCH. In addition, the term of the sub channel may be substituted with other terms such as a resource block group (RBG) or a set of RBGs, or a set of PRBs.

For example, 'startRBSubchannel' which is higher signaling or configuration information may indicate a start position of the sub channel on the frequency in the resource pool. For example, in an LTE V2X system, a resource block which is a frequency resource belonging to the resource pool for the PSSCH may be determined by a method described in [Table 11] presented below:

TABLE 11

-The resource block pool consists of $N_{subCH}$ sub-channels where $N_{subCH}$ is given by higher layer parameter numSubchannel.
-The sub-channel m for m=0, 1, ..., $N_{subCH}-1$ consists of a set of $n_{subCHsize}$ contiguous resource blocks with the physical resource block number $n_{PRB} = n_{subCHRBstart} + m * n_{subCHsize} + j$ for j=0, 1, ..., $N_{subCH}-1$ where $n_{subCHRBstart}$ and $n_{subCHsize}$ are given by higher layer parameter startRBSubchannel and sizeSubchannel, respectively A granularity of resource allocation on a time may be a slot in order to set the resource pool. In the disclosure, the resource pool is illustrated as a slot non-continuously allocated on the time, but the resource pool may be continuously allocated on the time or may be configured in the unit of a symbol.

In another example, when 'startSlot' which is higher signaling or configuration information indicates a start position of a slot on the time in the resource pool, sub-frames ($t_0^{SL}, t_1^{SL}, \ldots, t_{T_{max}}^{SL}()$), which are time resources belonging to the resource pool for the PSSCH in the LTE V2X system, may be determined by a method described in [Table 12] presented below:

TABLE 12

$0 \leq t_i^{SL} < 10240$,
the subframe index is relative to subframe#0 of the radio frame corresponding to SFN 0 of the serving cell or DFN 0 (described in [11]),
the set includes all the subframes except the following subframes,
subframes in which SLSS resource is configured,
downlink subframes and special subframes if the sidelink transmission occurs in a TDD cell,
reserved subframes which are determined by the following steps:
1) the remaining subframes excluding $N_{slss}$ and $N_{dssf}$ subframes from the set of all the subframes are denoted by $(l_0, l_1, \ldots, l_{(10240-Nslss-Ndssf-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.
2) a subframe lr ($0 \leq r < (10240 - N_{slss} - N_{dssf})$) belongs to the reserved subframe if $r = \left\lfloor \frac{m \cdot (10240 - N_{slss} - N_{dssf})}{N_{reserved}} \right\rfloor$ where m = 0, . . . , $N_{reserved} - 1$ and $N_{reserved} = (10240 - N_{slss} - N_{dssf})$ mod $L_{bitmap}$. Here, $L_{bitmap}$ the length of the bitmap is configured by higher layers.
the subframes are arranged in increasing order of subframe index.

TABLE 12-continued

A bitmap $(b_0, b_1, \ldots, b_{L_{bitmap}-1})$ associated with the resource pool is used where $L_{bitmap}$ the length of the bitmap is configured by higher layers.
A subframe $t_k^{SL}(0 \leq k < (10240 - N_{slss} - N_{dssf} - N_{reserved}))$ belongs to the subframe pool if $b_{k'} = 1$ where $k' = k \bmod L_{bitmap}$.

According to the procedure of [Table 14], at least one slot used as a downlink among slots (subframes in [Table 14]) of a specific period is excluded by the bitmap, and it is indicated which slot is included in the resource pool, and it is indicated which slot among the slots indicated as belonging to the resource pool belongs to the resource pool according to the bitmap.

A sidelink control channel may be referred to as a physical sidelink control channel (PSCCH), and a sidelink shared channel or a data channel may be referred to as a physical sidelink shared channel (PSSCH). In addition, a broadcast channel broadcasting along with a synchronization signal may be referred to as a physical sidelink broadcast channel (PSBCH), and a channel for feedback transmission may be referred to as a physical sidelink feedback channel (PSFCH). However, in order to transmit feedback, the PSCCH or the PSSCH may be used. According to a communication system, the above-described channels may be referred to as LTE-PSCCH, LTE-PSSCH, NR-PSCCH, NR-PSSCH. In the disclosure, the sidelink may refer to a link between terminals, and Uu link may refer to a link between a base station and a terminal.

Information transmitted in the sidelink may include sidelink control information (SCI), sidelink feedback control information (SFCI), sidelink channel state information (SCSI), and sidelink shared channel (SL-SCH) which is a transmission channel.

The above-described information and transmission channels may be mapped onto physical channels as shown in [Table 13] and Table 14]:

TABLE 13

| TrCH (Transport channel) | Physical Channel |
| --- | --- |
| SL-SCH | PSSCH |

TABLE 14

| Control information | Physical Channel |
| --- | --- |
| SCI | PSCCH |
| SFCI | PSFCH |
| SCSI | PSSCH |

Alternatively, if the SCSI is transmitted through the PSFCH, transmission channel-physical channel mapping may be applied as shown in table 15 and table 16:

TABLE 15

| TrCH (Transport channel) | Physical Channel |
| --- | --- |
| SL-SCH | PSSCH |

TABLE 16

| Control information | Physical Channel |
| --- | --- |
| SCI | PSCCH |
| SFCI | PSFCH |
| SCSI | PSSCH, PSFCH |

Alternatively, if the SCSI is transmitted to a higher layer, for example, is transmitted by using AM MAC CE, the SCSI may be transmitted through the PSSCH since the SCSI corresponds to the SC-SCH, and transmission channel-physical channel mapping may be applied as shown in [Table 17] and [Table 18]:

TABLE 17

| TrCH (Transport channel) | Physical Channel |
| --- | --- |
| SL-SCH | PSSCH |

TABLE 18

| Control information | Physical Channel |
| --- | --- |
| SCI | PSCCH |
| SFCI | PSFCH |
| SCSI | PSSCH, PSFCH |

When CSI of a sidelink is transmitted through the MAC CE, a reception terminal may transmit at least one piece of the following additional information to a transmission terminal.

Information of a slot in which sidelink CSI-RS used when the CSI is measured is transmitted, that is, information regarding a timing at which the sidelink CSI-RS is transmitted Information regarding a frequency domain where the CSI is measured, that is, information regarding a frequency domain in which the sidelink CSI-RS is transmitted. Including an index of a sub channel.

Information of a rank indicator (RI), a channel quality indicator (CQI)

Information of a preferred precoding matrix

Preferred beamforming-related information

ID information of a reception terminal which receives sidelink CSI-RS

ID information of a transmission terminal which transmits sidelink CSI-RS

Figure 12A:
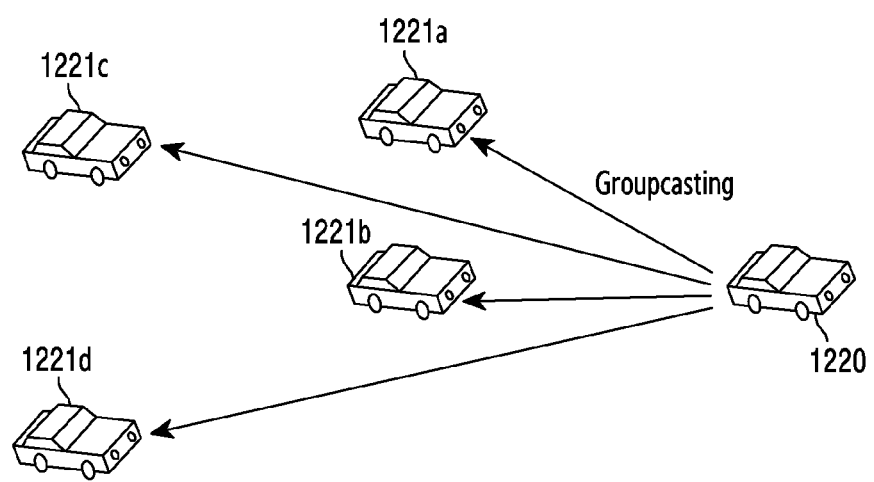
FIG. 12A is a view illustrating an example of groupcasting transmission in a wireless communication system according to various embodiments of the disclosure.

ID information of a reception terminal which transmits sidelink CSI feedback information ID information of a reception terminal which receives sidelink CSI feedback information FIG. 12A illustrates an example of groupcasting transmission in a wireless communication system according to various embodiments of the disclosure. Referring to FIG. 12A, a terminal 1220 transmits common data to a plurality of terminals 1221a, 1221b, 1221c, 1221d, that is, transmits data in a groupcasting method. The terminal 1220 and the terminals 1221a, 1221b, 1221c, 1221d may be movable devices like vehicles. At least one of separate control information (for example, sidelink control information (SCI)), a physical control channel (for example, a physical sidelink control channel (PSCCH), data may further be transmitted for groupcasting.

Figure 12B:
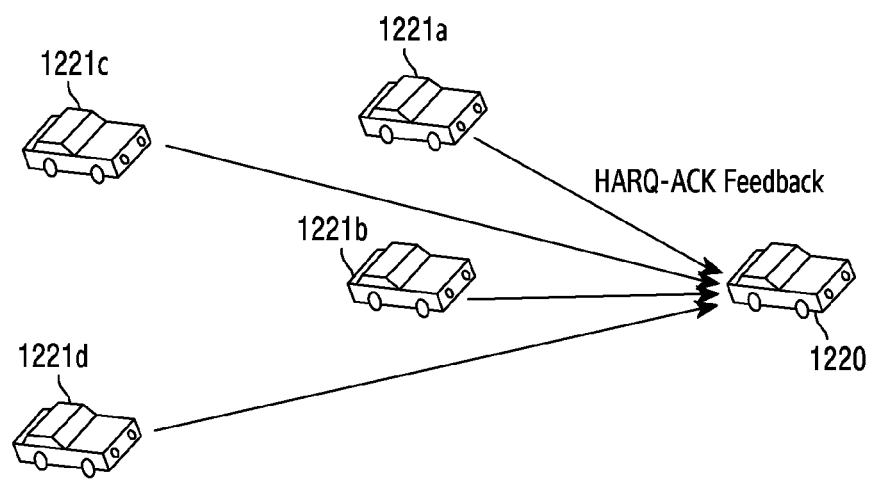
FIG. 12B is a view illustrating an example of transmission of a hybrid automatic repeat request (HARQ) feedback according to groupcasting in a wireless communication system according to various embodiments of the disclosure.

FIG. 12B illustrates an example of HARQ feedback transmission according to groupcasting in a wireless communication system according to various embodiments of the disclosure. Referring to FIG. 12B, the terminals 1221a, 1221b, 1221c, 1221d which receive the common data by groupcasting transmit, to the terminal 1220 having transmitted the data, information indicating data reception success or failure. The information may include HARQ-ACK feedback. Data transmission and feedback operations as shown in FIGS. 12A and 12B may be performed based on groupcasting. However, according to another embodiment, the data transmission and feedback operations as shown in FIGS. 12A and 12B may be applied to transmission of a unicast scheme.

Figure 13:
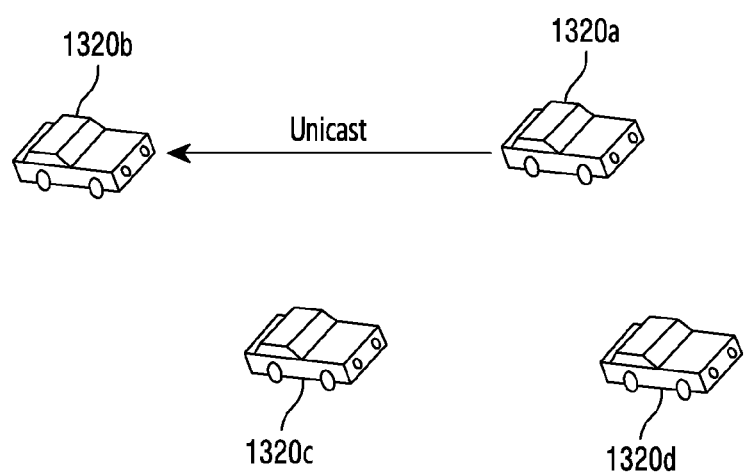
FIG. 13 is a view illustrating an example of unicasting transmission in a wireless communication system according to various embodiments of the disclosure.

FIG. 13 illustrates an example of unicasting transmission in a wireless communication system according to various embodiments of the disclosure.

terminals may be movable devices such as vehicles. At least one of separate control information, a physical control channel, data may further be transmitted for unicasting.

Figure 14A:
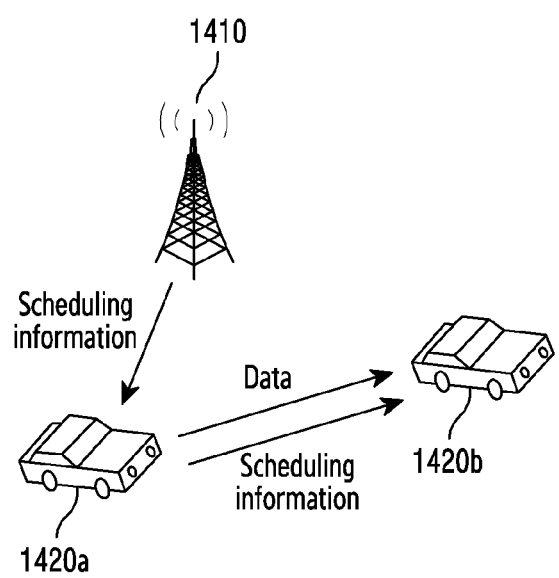
FIG. 14A is a view illustrating an example of sidelink data transmission according to scheduling of a base station in a wireless communication system according to various embodiments of the disclosure.

FIG. 14A illustrates an example of sidelink data transmission according to scheduling of a base station in a wireless communication system according to various embodiments of the disclosure. FIG. 14A illustrates a mode 1 in which a terminal receiving scheduling information from a base station transmits sidelink data. In the disclosure, a scheme for performing sidelink communication based on scheduling information is referred to as the mode 1, and may be referred to as other terms.

Referring to FIG. 14A, a terminal 1420a for transmitting data in a sidelink (hereinafter, referred to as a 'transmission terminal') receives scheduling information for sidelink communication from a base station 1410. The transmission terminal 1420a which receives scheduling information transmits sidelink data to another terminal 1420b (hereinafter, referred to as a 'reception terminal'). The scheduling information for sidelink communication may be included in a DCI, and the DCI may include at least one of the items shown in [Table 19] presented below:

TABLE 19

| Items | Details |
| --- | --- |
| Carrier indicator | used for the purpose of scheduling a sidelink of another carrier when carrier aggregation (CA) is applied |
| Lowest index of subchannel allocation for initial transmission | used for frequency resource allocation of initial transmission |
| Information to be included in sidelink control information | frequency resource allocation information. including resource allocation or resource reservation information regarding initial transmission and retransmission, and N number of times of transmission thereafter. Information of time interval between initial transmission and retransmission |
| Information on a sidelink slot structure | including information regarding which slot and which symbols are used in the sidelink. |
| HARQ-ACK/CSI feedback timing information | including timing information for transmitting HARQ-ACK or CSI feedback to a base station in a sidelink |
| Receiver ID | ID information regarding which terminals will receive |
| QoS (Quality-of-Service) information such as priority | Information regarding which data of which priority will be transmitted |

Referring to FIG. 13, a first terminal 1320a transmits data to a second terminal 1320b. In another example, a transmission direction of data may be opposite (for example, from the second terminal 1320b to the first terminal 1320a). Other terminals 1320c, 1320d except for the first terminal 1320a and the second terminal 1320b may not receive data which is transmitted and received between the first terminal 1320a and the second terminal 1320b in the unicast method. Transmission and reception of data between the first terminal 1320a and the second terminal 1320b through unicasting may be mapped in resources promised between the first terminal 1320a and the second terminal 1320b, may be scrambled by using a promised value, or may be transmitted by using a pre-set value. Alternatively, control information related to data between the terminal 1320a and the second terminal 1320 through unicasting may be mapped in a method promised therebetween. Alternatively, transmission and reception of data between the first terminal 1320a and the second terminal 1320b through unicasting may include an operation of identifying each other's unique IDs. The Scheduling may be performed for one sidelink transmission, or may be performed for periodic transmission or semi-persistent scheduling, or for configured grant transmission. The scheduling method may be identified by an indicator included in the DCI or may be identified by an RNTI or ID value scrambled into CRC added to the DCI. The DCI for sidelink transmission may further include a padding bit (for example, 0 bit), so that the DCI has the same size as a format of another DCI such as DCI for downlink scheduling or uplink scheduling.

The DCI for sidelink scheduling is received from the base station 1410, and the transmission terminal 1420a transmits a PSCCH including sidelink scheduling information, and then, transmits a PSSCH which is data corresponding thereto. The PSCCH which is sidelink scheduling information may include SCI, and the SCI may include at least one of items described in [Table 20] presented below:

TABLE 20

| Items | Details |
| --- | --- |
| HARQ process number | HARQ process ID for HARQ-related operation of data to be transmitted |
| NDI (new data indicator) | Information regarding whether currently transmitted data is new data |
| RV (redundancy version) | Information regarding which parity bit is transmitted when channel coding of data is performed and mapping is performed |
| Layer-1 source ID | ID information on a physical layer of a transmission terminal |
| Layer-1 destination ID | ID information on a physical layer of a reception terminal |
| Frequency-domain resource assignment for scheduling PSSCH | Frequency domain resource configuration information of data to be transmitted |
| MCS | Modulation order and code rate information |
| QoS indication | including priority, target latency/delay, target distance, target error rate, etc. |
| Antenna port(s) | Antenna port information for data transmission |
| DMRS sequence initialization | including information such as an ID value for initializing DMRS progression |
| PTRS-DMRS association | including information regarding PTRS mapping |
| CBGTI | utilized as an indicator for CBG unit retransmission |
| Resource reservation | Information for resource reservation |
| Time gap between initial transmission and retransmission | Time gap information between initial transmission and retransmission |
| Retransmission index | Indicator identifying retransmission |
| Transmission format)/(cast type indicator) | Identification indicator of a transmission format or unicast/groupcast/broadcast |
| Zone ID | Position information of a transmission terminal |
| NACK distance | Reference indicator for determining whether a reception terminal should transmit HARQ-ACK/NACK |
| HARQ feedback indication | including information regarding whether HARQ feedback should be transmitted or is being transmitted |
| Time-domain resource assignment for scheduling PSSCH) | Time domain resource information of sidelink data to be transmitted |
| Second SCI indication | Indicator including mapping information of the second SCI in the case of 2-stage control information |
| DMRS pattern | DMRS pattern (for example, symbol position where DMRS is mapped) information |

Control information including at least one of the items shown in [Table 20] may be included in one SCI or two SCIs to be transmitted to a reception terminal. The scheme for transmitting control information by dividing into two SCIs may be referred to as a 2-stage SCI.

Figure 14B:
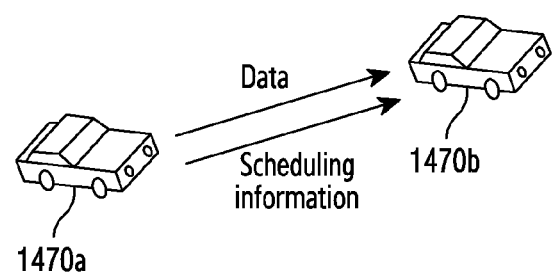
FIG. 14B is a view illustrating an example of sidelink data transmission without scheduling of a base station in a wireless communication system according to various embodiments of the disclosure.

FIG. 14B illustrates an example of sidelink data transmission without scheduling of a base station in a wireless communication system according to various embodiments of the disclosure. FIG. 14B illustrates a mode 2 in which a terminal transmits sidelink data without receiving scheduling information from a base station. In the disclosure, a scheme for performing sidelink communication without scheduling information is referred to as the mode 2, but may be referred to as other terms. A terminal 1420a to transmit data in a sidelink may determine by itself without scheduling from a base station and may transmit sidelink scheduling control information and sidelink data to a reception terminal 1420b. In this case, the sidelink scheduling control information may use the SCI of the same format as the SCI used in mode 1 sidelink communication. For example, the scheduling control information may include at least one of the items shown in [Table 20].

Figure 15:
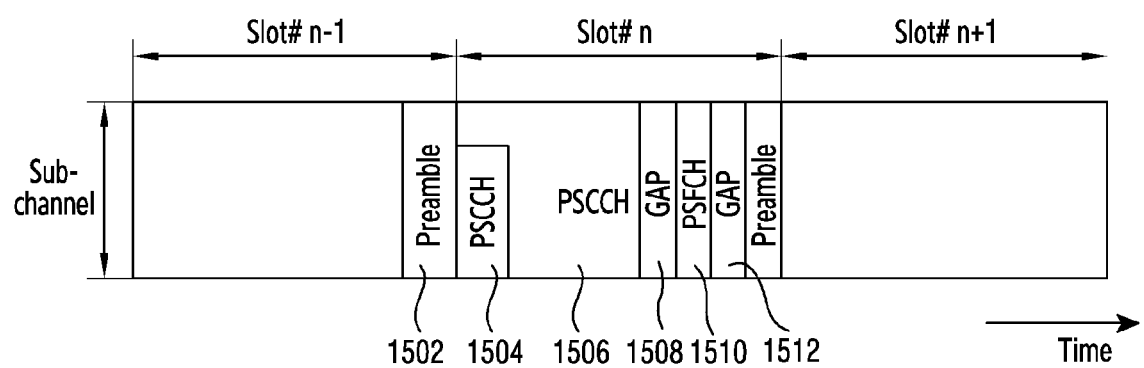
FIG. 15 is a view illustrating an example of a channel structure of a slot which is used for sidelink communication in a wireless communication system according to various embodiments of the disclosure.

FIG. 15 illustrates an example of a channel structure of a slot which is used for sidelink communication in a wireless communication system according to various embodiments of the disclosure. FIG. 15 illustrates physical channels which are mapped onto a slot for sidelink communication. Referring to FIG. 15, a preamble 1502 is mapped before a start of a slot, that is, onto a rear end of a previous slot. Thereafter, from the start of the slot, a PSCCH 1504, a PSSCH 1506, a gap 1508, a physical sidelink feedback channel (PSFCH) 1510, and a gap 1512 are mapped.

Before transmitting a signal in a corresponding slot, a transmission terminal transmits the preamble 1502 in one or more symbols. The preamble may be used to perform automatic gain control (AGC) appropriately in order to adjust an intensity of amplification when a reception terminal amplifies power of the reception signal. In addition, the preamble may be transmitted or may not be transmitted according to whether the transmission terminal transmits a previous slot or not. That is, when the transmission terminal transmits a signal to the same terminal in a previous slot (for example, slot #n−1) of the corresponding slot (for example, slot #n), transmission of the preamble 1502 may be omitted. The preamble 1502 may be referred to as a 'synchronization signal,' a 'sidelink synchronization signal,' a 'sidelink reference signal,' a 'midamble,' an 'initial signal,' a 'wake-up signal', or other terms having the same technical meanings as the above-described terms.

The PSCCH 1504 including control information may be transmitted by using symbols transmitted at the beginning of the slot, and the PSSCH 1506 scheduled by the control information of the PSCCH 1504 may be transmitted. At least part of SCI which is control information may be mapped onto the PSSCH 1504. Thereafter, there exists the gap 1508 and the PSFCH 1510 which is a physical channel for transmitting feedback information is mapped.

The terminal may already receive setting of a position of the slot in which the PSFCH is transmitted. Already receiving the setting may mean that setting is pre-defined in the process of making the terminal, is transmitted when the terminal connects to a system related to a sidelink, is transmitted from a base station when the terminal connects to the base station, or is received from another terminal.

FIG. 15 illustrates that the PSFCH 1510 is positioned at a rear portion compared to the PSSCH 1504 of the slot. The gap 1508 which is a predetermined blank time between the PSSCH 1504 and the PSFCH 1510 is guaranteed, so that the terminal transmitting or receiving the PSSCH 1504 is ready to receive or transmit the PSFCH 1510 (for example, to switch between transmission and reception). After the PSFCH 1510, there exists the gap 1512 which is a predetermined blank time.

Figure 16A:
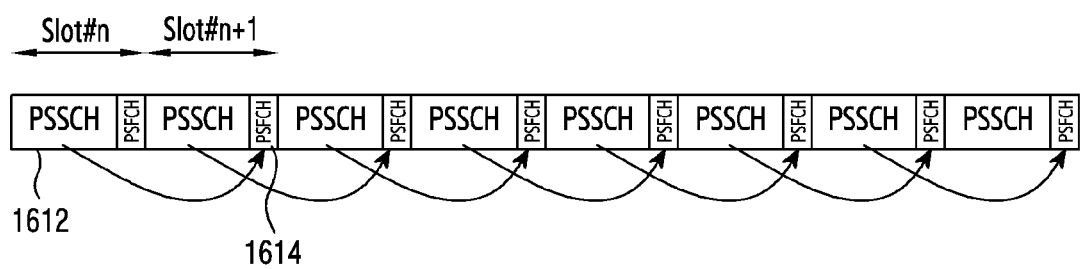
FIG. 16A is a view illustrating a first example of a distribution of feedback channels in a wireless communication system according to various embodiments of the disclosure.

FIG. 16A illustrates a first example of a distribution of feedback channels in a wireless communication system according to various embodiments of the disclosure. FIG. 16A illustrates a case where a resource for transmitting and receiving a PSFCH is allocated in every slot. The arrow from a PSSCH to the PSFCH indicates a slot of the PSFCH in which HARQ-ACK feedback information corresponding to the PSSCH is transmitted.

Referring to FIG. 16A, HARQ-ACK feedback information regarding the PSSCH 1612 transmitted in slot #n is transmitted in the PSFCH 1614 of slot #n+1. Since the PSFCH is allocated to every slot, the PSFCH may correspond to the slot including the PSSCH by 1:1. According to an embodiment, the PSFCH may be positioned on a tail portion of the slot. For example, when a period of a resource for transmitting and receiving the PSFCH is configured by a parameter such as 'periodicity_PSFCH_resource', periodicity_PSFCH_resource indicates 1 slot in the case of FIG. 16A. Alternatively, the period may be set in the unit of msec and may be indicated by a value allocated to every slot according to a sub carrier gap.

Figure 16B:
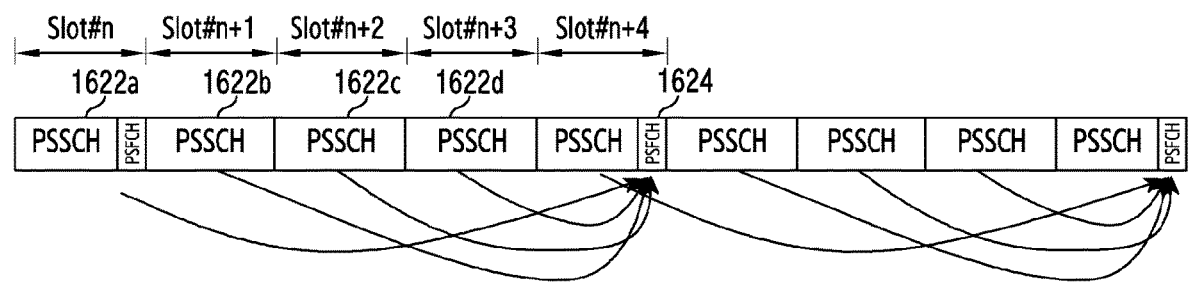
FIG. 16B is a view illustrating a second example of a distribution of feedback channels in a wireless communication system according to various embodiments of the disclosure.

FIG. 16B illustrates a second example of a distribution of feedback channels in a wireless communication system according to various embodiments of the disclosure. FIG. 16B illustrates a case where resources are allocated every 4 slots to be able to transmit and receive a PSFCH. In FIG. 16B, the arrow from the PSSCH to the PSFCH indicates a slot of the PSFCH in which HARQ-ACK feedback information corresponding to the PSSCH is transmitted.

Referring to FIG. 16B, only the last slot among the four slots includes the PSFCH. Similarly, only the last slot among the next four slots includes the PSFCH. Accordingly, HARQ-ACK feedback information regarding a PSSCH 1622a of slot #n, a PSSCH 1622b of slot #n+1, a PSSCH 1622c of slot #n+2, a PSSCH 1622d of slot #n+3 is transmitted on a PSFCH 1624 of slot #n+4. Herein, the indexes of the slots may be indexes of slots included in a resource pool. That is, the four slots may not be physically continuous slots, but may be slots continuously listed among slots included in the resource pool (or slot pool) used for sidelink communication between terminals. The reason why HARQ-ACK feedback information of the PSSCH transmitted on the 4th slot is not transmitted on the PSFCH of the same slot is that a processing time is not so short that the terminal finishes decoding the PSSCH transmitted on the corresponding slot and transmits the PSFCH on the same slot.

When transmitting or receiving the PSFCH, the terminal should know the number of HARQ-ACK feedback bits included in the PSFCH in order to transmit or receive appropriately. The number of HARQ-ACK feedback bits included in the PSFCH and which PSSCH HARQ-ACK bits are included may be determined based on at least one of the items shown in [Table 21] presented below or a combination of two or more items:

TABLE 21

| Items |
| --- |
| Period of a slot for transmitting and receiving a PSFCH by a parameter such as periodicity_PSFCH_resource |
| Information on whether HARQ-ACK is bundled. This information may be a value that is determined by performing AND operation with respect to HARQ-ACK bits of a PSFCH transmitted on a predetermined number of slots before PSFCH transmission and reception (that is, if only one is NACK, NACK is determined). |
| Number of transport blocks (TBs) included in the PSSCH |
| Whether retransmission of a code block group (CBG) unit is used and set |
| Whether HARQ-ACK feedback is activated |
| Number of really transmitted and received PSSCHs |
| Minimum processing time of a terminal for preparing PSSCH processing and PSFCH transmission |

If a resource for transmitting a PSFCH on slot #n+x is set or given, a terminal which receives a PSSCH on slot #n transmits information of HARQ-ACK feedback of the PSSCH by using a PSFCH of slot #n+x, where x is the smallest integer among integers which are larger than or equal to K. K may be a value that is pre-set by a transmission terminal, or may be a value that is set in a resource pool in which the corresponding PSSCH or PSFCH is transmitted. In order to set K, each terminal may already exchange its own capability information with a transmission terminal. For example, K may be determined according to at least one of a subcarrier gap, terminal capability, a setting value with the transmission terminal, or setting of the resource pool.

Various embodiments of the disclosure describe a scheme regarding which signal will be transmitted or received based on priority in transmitting or receiving a sidelink signal. Specifically, the disclosure describes embodiments for determining which signal will be transmitted or received when the priority is the same.

First Embodiment

Figure 17:
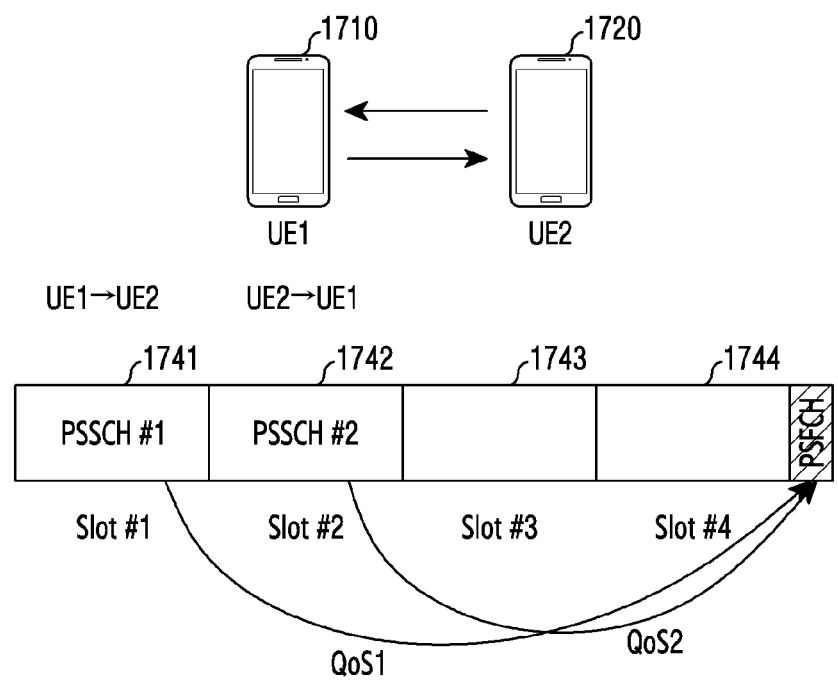
FIG. 17 is a view illustrating an example of determination of a transmission signal or a reception signal according to various embodiments of the disclosure.

FIG. 17 illustrates an example of determination of a transmission signal or a reception signal according to various embodiments of the disclosure. In FIG. 17, there are provided a method and an apparatus for solving or mitigating a problem that one terminal should both transmit and receive a PSFCH when there does not exist a PSFCH resource in every slot and the PSFCH resource is N according to configuration (N is an integer larger than 1). This problem may occur due to half-duplex restriction when the terminal does not perform transmission and reception of signals simultaneously.

Referring to FIG. 17, a first terminal 1710 (UE1) and a second terminal 1720 (UE2) may perform sidelink communication. For example, each of the first terminal 1710 and the second terminal 1720 may transmit or receive signals by connecting unicasting or groupcasting communication in a sidelink. In this case, each terminal should transmit a PSFCH on the same slot in order to transmit HARQ-ACK feedback regarding a signal (for example, a PSSCH) transmitted from each other. For example, the first terminal 1710 may transmit data (for example, PSSCH #1) to the second terminal 1720 on slot #1 1741, and the second terminal 1720 may transmit data (for example, PSSCH #2) to the first terminal 1710 on slot #2 1742. The second terminal 1720 may perform feedback regarding the data received from the first terminal 1710 on slot #1 1741. The first terminal 1710 may perform feedback regarding the data received from the second terminal 1720 on slot #2 1742.

According to a feedback transmission timing, the second terminal 1720 may transmit, to the first terminal 1710 on slot #4 1744, HARK-ACK feedback regarding PSSCH #1 that the first terminal 1710 transmits to the second terminal 1720 on slot #1 1741. In addition, the first terminal 1710 may transmit, to the second terminal 1720 on slot #4 1744, HARQ-ACK feedback regarding PSSCH #2 that the second terminal 1720 transmits to the first terminal 1710 on slot #2 1742. That is, the first terminal 1710 may determine a feedback timing regarding PSSCH #1 as slot #4 1744. The second terminal 1710 may determine a feedback timing regarding PSSCH #2 as slot #4 1744.

In this case, PSFCH #1 including feedback information regarding PSSCH #1 transmitted on slot #1 1741 may be transmitted from the second terminal 1720 to the first terminal 1710, and PSFCH #2 including feedback information regarding PSSCH #2 transmitted on slot #2 1742 may be transmitted from the first terminal 1710 to the second terminal 1720. In this case, the first terminal 1710 and the second terminal 1720 should both transmit and receive the PSFCH on slot #4, and transmission and reception of the PSFCH may be performed on the same symbol. That is, there may be an overlap (or collision) between a resource for receiving PSFCH #1 (for example, feedback information including feedback regarding PSSCH #1) of the first terminal 1710, and a resource for transmitting PSFCH #2 (for example, feedback information including feedback regarding PSSCH #2). Likewise, there may be an overlap (or collision) between a resource for transmitting PSFCH #1 (for example, feedback information regarding PSSCH #1) of the second terminal 1270, and a resource for receiving PSFCH #2 (for example, feedback information regarding PSSCH #2).

If the terminals are terminals that do not simultaneously transmit a certain signal and receive another signal, operation(s) of transmitting and receiving simultaneously within an overlapping resource may not be supported. It is mentioned that there is 'half-duplex restriction' when the terminal does not simultaneously perform transmission of a certain signal and reception of another signal. To the contrary, when the terminal is able to perform transmission of a certain signal and reception of another signal simultaneously, the terminal may be mentioned as having a full-duplex function.

When the terminal is set to transmit or receive without transmitting and receiving a PSFCH simultaneously, considering that the terminal is a half-duplex terminal, a method for the terminal to select transmission or reception of sidelink and to perform may apply one or a combination of one or more of the following methods:

Method 1: Method of determining based on SCI for scheduling a PSSCH.

The present method is a method for determining which terminal will receive a PSFCH, which terminal will transmit the PSFCH, based on a bit field value included in SCI transmitted or received by the terminal. For example, the first terminal 1710 may compare a QoS value (or priority, latency, delay, 5G QoS indicator (5QI), PC5 5QI (PQI)) of SCI included in the PSCCH which is transmitted when the first terminal 1710 transmits the PSSCH (referred to as PSSCH #1) on slot #1 1741, and a QoS value included in the PSCCH for scheduling the PSSCH (referred to as PSSCH #2) received on slot #2 1742 from the second terminal 1720, and may determine to transmit and receive HARQ-ACK feedback of a PSSCH corresponding to high QoS (or having a value corresponding to high priority). For example, if the priority value of the SCI included in the PSCCH which is transmitted when terminal #1 1710 transmits PSSCH #1 on slot #1 1741 is 1, and the priority value included in the PSCCH for scheduling PSSCH #2 received from terminal #2 1720 on slot #2 1742 is 4 (it is assumed that priority 1 is higher than priority 4), the first terminal 1710 may receive PSFCH #1 (for example, including feedback information regarding PSSCH #1) on slot #4 1744, and the second terminal 1720 may transmit PSFCH #1 on slot #4 1744. In this case, the PSFCH #1 may include HARQ-ACK feedback information regarding PSSCH #1 that the first terminal 1710 transmits on slot #1 1741.

In this case, when the QoS values corresponding to the PSSCHs transmitted by the terminals are the same in the above-described example, it may be determined which PSSCH the terminal should transmit feedback on, based on designated rules. For example, the terminal may determine whether to transmit each PSFCH in a corresponding slot so as to transmit the PSFCH including HARQ-ACK information regarding the PSSCH transmitted first with reference to the PSSCH transmitted first.

Method 1-1: In applying method 1 described above, when QoS values corresponding to PSSCHs transmitted by the terminals are the same, the following rules may be applied:

Rule 1: Rule 1 is to transmit a PSFCH including HARQ-ACK information regarding a PSSCH that is transmitted first. The terminal may identify a PSSCH (for example, PSSCH #1 out of PSSCH #1, #2) that is transmitted first among PSSCHs. The terminal may transmit a PSFCH including HARQ-ACK information regarding the identified PSSCH.

Rule 2: Rule 2 is to transmit a PSFCH including HARQ-ACK information regarding a PSSCH that is transmitter later. The terminal may identify a PSSCH (for example, PSSCH #2 among PSSCH #1, #2) that is transmitted later among PSSCHs. The terminal may transmit a PSFCH including HARQ-ACK information regarding the identified PSSCH.

Rule 3: Rule 3 is to transmit a PSFCH including HARQ-ACK information regarding a PSSCH that has a larger TBS. The terminal may identify a PSSCH that has a largest TBS among PSSCHs. For example, the terminal may determine a TBS of each PSSCH, based on fields (for example, a resource allocation field, an MCS field) of the SCI, and may identify the PSSCHF having a larger TBS. The terminal may transmit a PSFCH including HARQ-ACK information regarding the identified PSSCH.

Rule 4: Rule 4 is to transmit a PSFCH including HARQ-ACK information regarding a PSSCH having a larger MCS value. The terminal may identify a PSSCH having a highest MCS among PSSCHs. For example, the terminal may identify a PSSCH, based on a size of an MCS of SCI for each PSSCH. The terminal may transmit a PSFCH including HARQ-ACK information regarding the identified PSSCH.

Rule 5: Rule 5 is to transmit a PSFCH including HARQ-ACK information regarding a PSSCH for initial transmission rather than a PSSCH for retransmission. For example, the terminal may identify a PSSCH based on an NDI field of SCI for each PSSCH, and the terminal may transmit a PSFCH including HARQ-ACK information regarding the identified PSSCH.

Rule 6: Rule 6 is to transmit a PSFCH including HARQ-ACK information regarding a PSSCH including SL-SCH, that is, data, rather than a PSSCH that does not include SL-SCH, that is, data.

The above-described rules may be executed by one rule or a combination of one or more rules, and orders for applying the rules may be already promised. For example, the PSSCH may be identified in the order of rules 1→4→5. That is, in the case of PSSCHs transmitted on the same slot, the terminal may compare MCS levels. The terminal may transmit a PSFCH to include HARQ-ACK regarding a PSSCH having a higher MCS level. In this case, if the MCS levels are the same, the terminal may transmit a PSFCH including HARQ-ACK regarding a PSSCH for initial transmission rather than a PSSCH for retransmission. In another example, the PSSCH may be identified in the order of rules 5→3→2. That is, when all PSSCHs are retransmitted or are newly transmitted, the terminal may compare TBS sizes. In this case, if the TBS sizes are the same, the terminal may transmit a PSFCH including HARQ-ACK regarding a PSSCH that is transmitted first.

Method 2: Method for determining according to an order of transmitting a PSSCH. The terminal may identify a PSSCH to transmit HARQ-ACK feedback among PSSCHs, based on a time (for example, a slot) at which each PSSCH is transmitted. That is, the present method is a method for determining which terminal will receive a PSFCH, which terminal will transmit a PSFCH, based on a transmission and reception slot index order of PSSCHs transmitted or received by the terminal, that is, based on which PSSCH is transmitted first. This method may be determined by a timing at which a PSFCH including HARQ-ACK regarding the transmitted PSSCH is transmitted. For example, when PSFCH transmission and reception resources are set to be positioned in every N slot, HARQ-ACK regarding a PSSCH transmitted on slot n may be transmitted on slot $\lceil (n+\Delta)/N \rceil \times N$. Alternatively, by substituting equation, HARQ-ACK regarding a PSSCH transmitted on slot n may be transmitted on slot $n+N+\Delta-1-\mod(n+\Delta-1, N)$. In the above-described equation, $\Delta$ is a parameter that means a gap between transmission slots of the PSSCH and the HARQ-ACK received by the terminal. According to an embodiment, $\Delta$ may be a value that is set or pre-configured in every resource pool. In addition, according to an embodiment, $\Delta$ may be understood equally by terminals through PC5-RRC configuration. $\Delta$ may be differently defined according to a subcarrier spacing (SCS). The above-described equation $n+N+\Delta-1-\mod(n+\Delta-1, N)$ implies that a PSFCH including HARQ-ACK feedback regarding a PSSCH transmitted on the following slot $n-N-\Delta+1, n-N-\Delta+2, \ldots, n-\Delta-1, n-\Delta$ is transmitted on slot n. In this case, for example, if the first terminal 1710 transmits PSSCH #1 to terminal 2 on slot $n-N-\Delta+1$ (slot number of slot #1) and the second terminal 1720 transmits PSSCH #2 to the first terminal 1710 on slot $n-N-\Delta+2$ (slot number of slot #2), HARQ-ACK feedback information regarding the two PSSCHs should be all transmitted on slot n. In the present method, a PSFCH including HARQ-ACK regarding PSSCH #1 transmitted first, that is, a PSSCH that the first terminal 1710 transmits to the second terminal 1720 on slot $n-N-\Delta+1$ may be transmitted (from the position of first terminal 1710) or received (from the position of the second terminal 1720) on slot n. The first terminal 1710 may receive a PSFCH on slot n and the second terminal 1720 may transmit a PSFCH on slot n, and the PSFCH may include HARQ-ACK regarding the PSSCH that the first terminal 1710 transmits to the second terminal 1270 on slot $n-N-\Delta+1$.

Second Embodiment

Figure 18:
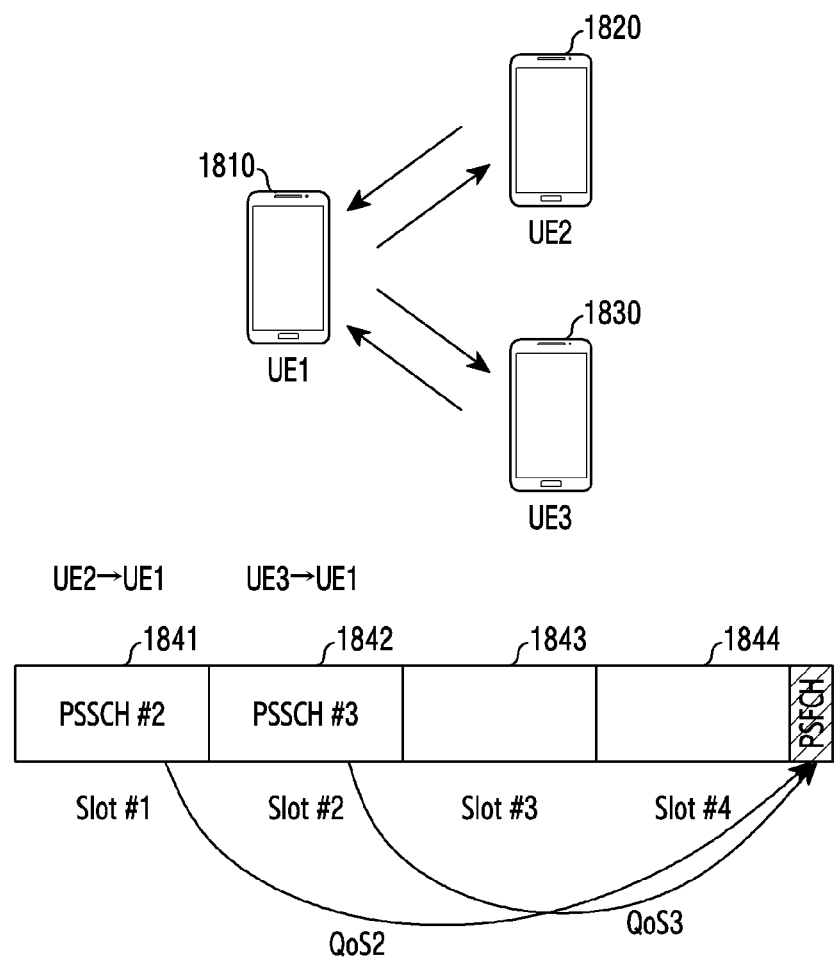
FIG. 18 is a view illustrating another example of determination of a transmission signal or a reception signal according to various embodiments of the disclosure.

FIG. 18 illustrates an example of determination of a transmission signal or a reception signal according to various embodiments of the disclosure. FIG. 18 provides a method and an apparatus which, when a PSFCH resource does not exist in every slot and is N according to configuration (N is an integer larger than 1), may solve or mitigate a problem that one terminal should transmit a PSFCH to a plurality of terminals. This problem may occur because of the limitation that the terminal only transmits one physical channel at a time. The present embodiment describes a method of transmitting a PSFCH when one terminal should transmit the PSFCH to a plurality of terminals. However, contents of the present embodiment may be applied when one terminal transmits a plurality of PSFCHs according to a plurality of transmission types to one or two or more terminals. That is, the present embodiment may be applied when one terminal should transmit a PSFCH for unicasting and a PSFCH for groupcasting to another terminal on the same symbol of the same slot.

Referring to FIG. 18, when a first terminal 1810 (UE1) is connected with a second terminal 1820 (UE2) and a third terminal 1830 (UE3) through unicasting or groupcasting communication, and performs signal transmission and reception, UE1 should transmit two PSFCHs on the same slot in order to transmit HARQ-ACK feedback regarding PSSCHs transmitted to UE1 by UE2 and UE3. In the above-described example, the second terminal 1820 and the third terminal 1830 are different from each other, but the second terminal 1820 and the third terminal 1830 may be the same terminal. In the present embodiment, a method for transmitting a PSFCH when one terminal should transmit the PSFCH to a plurality of terminals is described, but, if the present embodiment is applied when one terminal transmits a plurality of PSFCHs according to a plurality of transmission types to one terminal, the second terminal 1820 and the third terminal 1830 may be the same terminal.

Hereinafter, an example where the second terminal 1820 transmits PSSCH #2 to the first terminal 1810 on slot #1 1841, and the third terminal 1830 transmits PSSCH #3 to the first terminal 1810 on slot #1 will be described. The first terminal 1810 may encode HARQ-ACK feedback information regarding the two PSSCHs into PSFCHs, and may determine a PSFCH transmission and reception timing so as to transmit the respective PSFCHs to the second terminal 1820 and the third terminal 1830 on slot #4 1841. In this example, if the first terminal 1810 is able to both transmit the PSFCH (referred to as PSFCH #2) to the second terminal 1820 and transmit the PSFCH (referred to as PSFCH #3) to the third terminal 1830 on slot 4, the second terminal 1820 and the third terminal 1830 may receive the PSFCHs from the first terminal 1810, simultaneously, and the second terminal 1820 and the third terminal 1830 may identify HARQ-ACK feedback information regarding the PSSCHs that they have transmitted. However, if UE1 is not able to transmit PSFCH #2 and PSFCH #3 on slot #4, simultaneously, the first terminal 1810 may need to determine which PSFCH will be transmitted. The first terminal 1810 may not be able to transmit PSFCH #2 and PSFCH #3 simultaneously since transmit power is inefficient, and, if power is divided and is used for PSFCHs, there may be a problem that a coverage of each PSFCH is reduced.

Accordingly, the terminal according to various embodiments of the disclosure may select one PSFCH so as not to transmit or receive two or more PSFCHs, and may transmit (or receive) the same. In this case, a method for selecting a PSFCH, for example, selecting which PSSCH HARQ-ACK feedback should be performed on may apply one or a combination of one or more of the following methods:

Method 1: Method for determining based on SCI for scheduling a PSSCH

The present method is a method for a terminal to determine which PSSCH a PSFCH to transmit corresponds to, based on a bit field value included in received SCI. For example, as shown in FIG. 18, the first terminal 1810 may compare a QoS value (or priority, latency, delay, PQI, 5QI) of SCI included in a PSCCH that is transmitted for scheduling of a corresponding PSSCH when the second terminal 1820 transmits the PSSCH (referred to as PSSCH #2) to the first terminal 1810 on slot #1 1741, and a QoS value of SCI included in a PSCCH that is transmitted for scheduling of a corresponding PSSCH when the third terminal 1830 transmits the PSSCH (referred to as PSSCH #3) to the first terminal 1820 in slot #2 1842, and may determine to transmit and receive HARQ-ACK feedback of a PSSCH corresponding to high QoS (or having a value corresponding to high priority). For example, the first terminal 1810 may receive PSSCH #2 from the second terminal 1820 on slot #1 1841 (a priority value of the SCI included in PSCCH #2 that is transmitted for scheduling of PSSCH #2 is 1), and may receive PSSCH #3 from the third terminal 1830 on slot #2 1842 (a priority value of the SCI included in the PSCCH that is transmitted for scheduling of PSSCH #3 is 4). In this case, since the priority of PSSCH #2 is higher than the priority of PSSCH #3 (it is assumed that priority 1 is higher than priority 4), the first terminal 1810 may transmit a PSFCH to the second terminal 182 on slot #4. The PSFCH may include HARQ-ACK feedback information regarding PSSCH #2 that the second terminal 1820 transmits on slot #1. If the QoS values corresponding to the PSSCHs transmitted by the terminals are the same, it may be determined whether each PSFCH will be transmitted on a corresponding slot, so that a PSFCH including HARQ-ACK information regarding the PSSCH that is transmitted first is transmitted, with reference to the PSSCH transmitted first.

Method 1-1: In applying method 1 described above, when QoS values corresponding to PSSCHs transmitted by the terminals are the same, the following rules may be applied:

Rule 1: Rule 1 is to transmit a PSFCH including HARQ-ACK information regarding a PSSCH that is transmitted first. The terminal may identify a PSSCH (for example, PSSCH #2 out of PSSCH #2, #3) that is transmitted first among PSSCHs. The terminal may transmit a PSFCH including HARQ-ACK information regarding the identified PSSCH.

Rule 2: Rule 2 is to transmit a PSFCH including HARQ-ACK information regarding a PSSCH that is transmitter later. The terminal may identify a PSSCH (for example, PSSCH #2 among PSSCH #2, #2) that is transmitted later among PSSCHs. The terminal may transmit a PSFCH including HARQ-ACK information regarding the identified PSSCH.

Rule 3: Rule 3 is to transmit a PSFCH including HARQ-ACK information regarding a PSSCH that has a larger TBS. The terminal may identify a PSSCH that has a largest TBS among PSSCHs. For example, the terminal may determine a TBS of each PSSCH, based on fields (for example, a resource allocation field, an MCS field) of SCI, and may identify a PSSCHF that has a larger TBS. The terminal may transmit a PSFCH including HARQ-ACK information regarding the identified PSSCH.

Rule 4: Rule 4 is to transmit a PSFCH including HARQ-ACK information regarding a PSSCH that is a larger MCS value. The terminal may identify a PSSCH that has a highest MCS among PSSCHs. For example, the terminal may identify a PSSCH, based on a size of an MCS index of SCI for each PSSCH. The terminal may transmit a PSFCH including HARQ-ACK information regarding the identified PSSCH.

Rule 5: Rule 5 is to transmit a PSFCH including HARQ-ACK information regarding a PSSCH for initial transmission rather than a PSSCH for retransmission. For example, the terminal may identify a PSSCH based on an NDI field of SCI for each PSSCH, and the terminal may transmit a PSFCH including HARQ-ACK information regarding the identified PSSCH.

Rule 6: Rule 6 is to transmit a PSFCH including HARQ-ACK information regarding a PSSCH including SL-SCH, that is, data, rather than a PSSCH that does not include SL-SCH, that is, data.

The above-described rules may be executed by one rule or a combination of one or more rules, and orders for applying the rules may be already promised. For example, the PSSCH may be identified in the order of rules 1→4→5. That is, in the case of PSSCHs transmitted on the same slot, the terminal may compare MCS levels. The terminal may transmit a PSFCH to include HARQ-ACK regarding a PSSCH having a higher MCS level. In this case, if the MCS levels are the same, the terminal may transmit a PSFCH including HARQ-ACK regarding a PSSCH for initial transmission rather than a PSSCH for retransmission. In another example, the PSSCH may be identified in the order of rules 5→3→2. That is, when all PSSCHs are retransmitted or are newly transmitted, the terminal may compare TBS sizes. In this case, if the TBS sizes are the same, the terminal may transmit a PSFCH including HARQ-ACK regarding a PSSCH that is transmitted first.

Method 2: Method for determining according to an order of transmitting a PSSCH. The terminal may identify a PSSCH to transmit HARQ-ACK feedback among PSSCHs, based on a time (for example, a slot) at which each PSSCH is transmitted. That is, the present method is a method for determining which PSSCH HARQ-ACK of a PSFCH to transmit is related to, based on a transmission and reception slot index order of PSSCHs transmitted or received by the terminal, that is, based on which PSSCH is transmitted first. This method may be determined by a timing at which a PSFCH including HARQ-ACK regarding the transmitted PSSCH is transmitted. For example, when PSFCH transmission and reception resources are set to be positioned in every N slot, HARQ-ACK regarding a PSSCH transmitted on slot n may be transmitted on slot $\lceil(n+\Delta)/\rceil \times N$. Alternatively, by substituting equation, HARQ-ACK regarding a PSSCH transmitted on slot n may be transmitted on slot $n+N+\Delta-1-\mathrm{mod}(n+\Delta-1, N)$. In the above-described equation, $\Delta$ is a parameter that means a gap between transmission slots of the PSSCH and the HARQ-ACK received by the terminal. According to an embodiment, $\Delta$ may be a value that is set or pre-configured in every resource pool. In addition, according to an embodiment, $\Delta$ may be understood equally by terminals through PC5-RRC configuration. Δ may be differently defined according to a subcarrier spacing (SCS). The above-described equation n+N+Δ−1−mod(n+A−1, N) implies that a PSFCH including HARQ-ACK feedback regarding a PSSCH transmitted on the following slot n−N−Δ+1, n−N−Δ+2, . . . , n−Δ−1, n−Δ is transmitted on slot n. In this case, for example, if the first terminal 1810 receives a PSSCH from the second terminal 1820 on slot n−N−Δ+1 and the first terminal 1810 receives a PSSCH from the third terminal 1830 on slot n−N−Δ+2, HARQ-ACK feedback information regarding the two PSSCHs (PSSCH #2, PSSCH #3) should be all transmitted on slot n. In the present method, a PSFCH including HARQ-ACK regarding a PSSCH that is transmitted first, that is, PSSCH #2 that the first terminal 1810 receives from the second terminal 1820 on slot n−N−Δ+1 may be transmitted or received on slot n. In the above-described example, both the second terminal 1820 and the third terminal 1830 may try to decode the PSFCH in slot n, but, since the first terminal 1810 transmits the PSFCH to the second terminal 1820, only the second terminal 1820 may succeed in receiving the PSFCH.

Method 3: Method for a terminal to transmit feedback information to two or more terminals, simultaneously, by using one PSFCH. This method may be determined by a timing at which a PSFCH including HARQ-ACK regarding a transmitted PSSCH is transmitted. For example, when PSFCH transmission and reception resources are set to be positioned in every N slot, HARQ-ACK regarding a PSSCH transmitted on slot n may be transmitted on slot $\lceil(n+\Delta)/\rceil \times N$. By substituting equation, the HARQ-ACK may be transmitted on slot n+N+Δ−1−mod (n+A−1, N). Δ is a parameter that means a gap between transmission slots of the PSSCH and the HARQ-ACK received by the terminal, and may be a value that is set or pre-configured in every resource pool, or may be understood equally by terminals through PC5-RRC configuration. Δ may be differently defined according to a subcarrier spacing (SCS). This equation implies that the PSFCH including HARQ-ACK feedback regarding the PSSCH that is transmitted on the following slot n−N−Δ+1, n−N−Δ+2, . . . , n−Δ−1, n−Δ is transmitted on slot n. In this case, for example, if the first terminal 1810 receives a PSSCH from the second terminal 1820 on slot n−N−Δ+1 and the first terminal 1810 receives a PSSCH from the third terminal 1830 on slot n−N−Δ+2, all HARQ-ACK feedback information regarding the two PSSCHs should be transmitted on slot n. In the present method, while transmitting N pieces of HARQ-ACK information on slot n, the terminal may position the HARQ-ACK information regarding the PSSCH received from the second terminal 1820 on slot n−N−Δ+1 on the first information of the N pieces of HARQ-ACK information, and may position the HARQ-ACK information regarding the PSSCH received from the third terminal 1830 on slot n−N−Δ+2 on the second information of the N pieces of HARQ-ACK information, and may transmit the HARQ-ACK information. If the first terminal 1810 fails to receive a PSSCH in a certain slot in a certain period, HARQ-ACK feedback corresponding to the slot may be described as a predetermined value and may be configured as a HARQ-ACK feedback codebook. For example, a HARQ-ACK feedback value regarding a PSSCH that is not received may be determined to be a value meaning NACK. According to an embodiment, a terminal (for example, the first terminal 1810) may transmit HARQ-ACK feedback to respective terminals (for example, the terminal 1820, the terminal 1830) through the PSFCH in a unicasting method. In this case, identifiers regarding the respective terminals may be used for signals of the respective PSFCHs. In addition, according to an embodiment, a terminal (for example, the first terminal 1810) may transmit HARQ-ACK feedback to a terminal group (for example, including the terminal 1820, the terminal 1830) through the PSFCH in a groupcasting method. In this case, an identifier regarding the group may be used for signals of the respective PSFCHs.

Method 4: Method for determining according to the number of feedback bits that a terminal should transmit. That is, this method is a method which, when the first terminal 1810 should transmit feedback to the second terminal 1820 and the third terminal 1830, transmits feedback to a terminal to which more pieces of feedback should be transmitted, through a PSFCH. If an amount of feedback to be transmitted to the second terminal 1820 and an amount of feedback to be transmitted to the third terminal 1830 are the same as each other, the terminal may determine which terminal to transmit feedback to, or may apply some of the suggested methods in the above-described methods 1, 2, 3, or a combination method thereof Method 5: Method for transmitting all of a plurality of PSFCHs including feedback that a terminal should transmit. However, when the plurality of PSFCHs are transmitted, if a sum of power used for PSFCH transmission is greater than maximum power Pc,max that the terminal uses for sidelink transmission, the terminal may reduce power of each PSFCH within Pc,max and then may transmit the respective PSFCHs. According to an embodiment, the terminal may reduce power of the PSFCH according to an original power rate of the PSFCH, so that the sum of power of all PSFCHs reaches Pc,max, and then may transmit the PSFCHs. That is, for example, when the first terminal 1810 should transmit PSFCH #1 and PSFCH #2, and respective calculated powers are P1, P2, if P1+P2>Pc,max, power of the PSFCH1 may be determined as $P_{c,max} \times$ P1/(P1+P2), and power of the PSFCH2 may be determined as $P_{c,max} \times$ P2/(P1+P2). That is, this is to make the sum of the powers of the PSFCH1 and the PSFCH2 reach Pc,max. In addition, according to an embodiment, the terminal may transmit a PSFCH (for example, PSFCH #1) regarding a PSSCH of high priority with calculated power (for example, P1), and may transmit a PSFCH (for example, PSFCH #2) regarding a PSSCH of low priority with calculated power (for example, P2) or remaining power (for example, Pc,max−P1). An identifier of a corresponding terminal may be used for the transmitted feedback, or a group identifier of the terminal may be used according to the number of terminals for transmitting or a scheme.

Method 6: Method for determining according to the number of pieces of scheduling control information received by a terminal. That is, this is a method for determining according to the number of PSSCHs scheduled for a terminal to receive. That is, this method is a method which, when the first terminal 1810 should transmit feedback to the second terminal 1820 and the third terminal 1830, transmits feedback to a terminal from which more PSSCHs are scheduled, through a PSFCH. If the number of PSSCHs scheduled from the second terminal 1820 and the number of PSSCHs scheduled from the third terminal 1830 are the same as each other, the terminal may determine which terminal to transmit feedback to, or may apply some of methods suggested in the above-described methods 1, 2, 3, 4, 5, and a combination method thereof.

According to various embodiments, the terminal may identify a first feedback timing of feedback information regarding a first PSSCH. In addition, the terminal may identify a second feedback timing of feedback information regarding a second PSSCH. In this case, when the first feedback timing and the second feedback timing overlap (or a collision is expected, for example, all feedback in the same slot), the terminal may not transmit all feedback due to a problem in capability of the terminal or power, or may have difficulty in performing transmission/reception simultaneously. In some embodiments, the terminal may identify one of feedback information regarding the first PSSCH and feedback information regarding the second PSSCH, based on first control information (for example, SCI) regarding the first PSSCH and second control information regarding the second PSSCH. The terminal may transmit (or receive) the identified PSSCH at the corresponding feedback timing. In addition, in some embodiments, the terminal may identify one of the feedback information regarding the first PSSCH and the feedback information regarding the second PSSCH, based on an order in which the respective PSSCHs are transmitted (for example, the order of slot numbers). The terminal may transmit (or receive) the identified PSSCH at the corresponding feedback timing.

Although it is illustrated in FIGS. 17 and 18 that there is a collision in feedback between the two PSSCHs, the disclosure is not limited thereto. The disclosure may be applied to a case where three or more PSSCHs are received and there is a collision thereamong.

In addition, FIG. 17 illustrates that there is a collision between transmission and reception of the PSFCH (for example, transmission of HARQ-ACK feedback regarding PSSCH #1 and reception of HARQ-ACK feedback regarding PSSCH #2), and FIG. 18 illustrates that there is a collision between transmission of the PSFCH (for example, transmission of HARQ-ACK feedback regarding PSSCH #2) and transmission of the PSFCH (for example, transmission of HARQ-ACK feedback regarding PSSCH #3), but the disclosure is not limited thereto. For example, two PSFCH transmission timings and one PSFCH reception timing may collide with each other. In this case, the methods of FIGS. 17 and 18 may be applied all together or at least some of the methods may be combined and applied.

In an example, the first terminal may transmit PSSCH #1 to the second terminal on slot #1. The second terminal may transmit PSSCH #2 to the first terminal on slot #2. The third terminal may transmit PSSCH #3 to the first terminal on slot #3. The first terminal may determine all of the feedback timing of the PSSCH received from the second terminal, the feedback timing of the PSSCH received from the third terminal, and the feedback timing of the PSSCH of the second terminal regarding the PSSCH of the first terminal received from the first terminal as one slot #4. In this case, according to an embodiment, the first terminal may determine a priority according to QoS, and, when QoS is the same, the first terminal may determine which operation of the transmission and the reception the terminal will perform, first, and then, when the transmission operation is determined, may determine a priority of the PSSCHs according to the method of FIG. 18. Thereafter, the first terminal may transmit a PSFCH including HARQ-ACK feedback regarding a PSSCH of high priority, or may transmit a PSFCH including HARQ-ACK feedback regarding all PSSCHs. According to another embodiment, a PSSCH for feedback among the transmitted PSSCHs may be identified according to the method of FIG. 18, and then, it may be determined which PSSCH the PSFCH including HARQ-ACK feedback to be transmitted is related, through comparison of the priority of the identified PSSCH and SCI of the received PSSCH. According to still another embodiment, the first terminal may transmit or receive a PSFCH of highest priority, based on an order of designated rules as the method 1 of FIG. 17 or 18 among all PSSCHs within a period. For example, the first terminal may transmit a PSFCH including HARQ-ACK regarding a PSSCH that is transmitted first.

In addition, it is illustrated in FIGS. 17 and 18 that a PSSCH is selected according to a specific rule, but various embodiments of the disclosure are not limited thereto. According to an embodiment, a priority rule may be defined to calculate one matric based on the above-described rules. The terminal may calculate a priority value of each PSSCH based on at least one of the above-described rules, and may transmit a PSFCH including HARQ-ACK regarding a PSSCH of highest priority or N number of higher PSSCHs (N>1).

Third Embodiment

Figure 19:
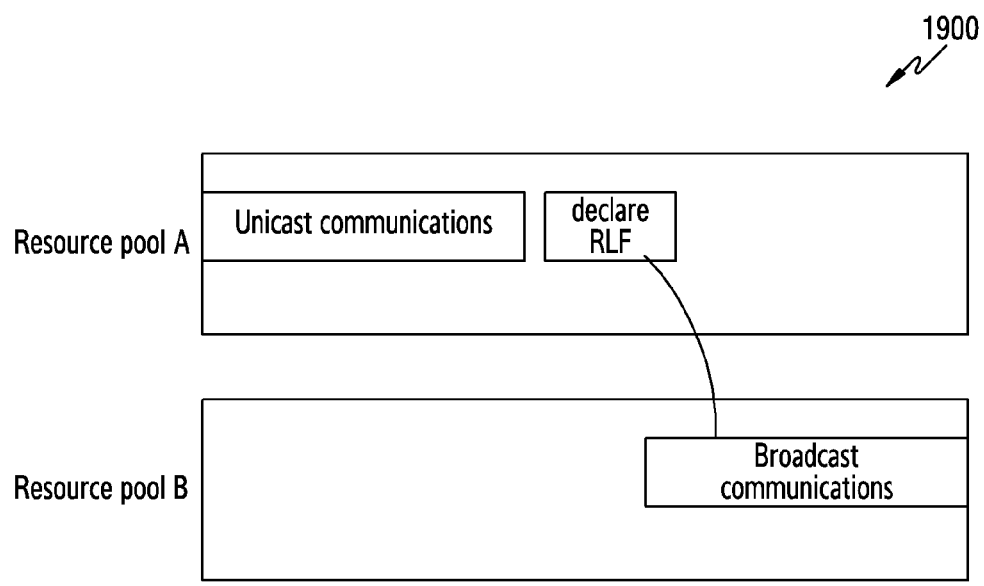
FIG. 19 is a view illustrating still another example of determination of a transmission signal or a reception signal according to various embodiments of the disclosure.

FIG. 19 illustrates still another example of determination of a transmission signal or a reception signal according to various embodiments of the disclosure. In the third embodiment, there are provided a method and an apparatus by which, while performing communication between terminals, one terminal performs unicast data transmission and reception with another specific terminal in one resource pool, and, when connection with the specific terminal is finished, performs transmission and reception in another resource pool, that is, changes the resource pool.

Referring to FIG. 19, a first terminal may perform unicast transmission and reception with a second terminal in resource pool A, and, after unicast transmission and reception is finished, may perform transmission and reception in resource pool B. The first terminal may frequently measure quality of a wireless channel to the second terminal in the middle of performing unicast transmission and reception with the second terminal, and may declare RFL meaning that the channel is not good, like radio link failure (RLF), according to corresponding channel quality. The declaring may mean that connection to the corresponding terminal is not effective, and it may be better for the first terminal to discover other frequency resources in order to continue communication with the second terminal. Accordingly, the first terminal may perform transmission and reception of signals in resource pool B, and accordingly, may try to reconnect to the second terminal. Alternatively, the first terminal may perform transmission and reception operations in resource pool B in order to perform data transmission and reception with other terminals (for example, the terminal in resource pool B may broadcast signals). That is, in the present embodiment, the first terminal may declare the RLF regarding connection with the second terminal, and may shift the resource pool and may provide performance of transmission and reception. Information regarding a resource pool (for example, resource pool B) to which the terminal shifts after declaring RLF and tries to transmit and receive may be configured in various schemes. According to an embodiment, the resource pool that is shifted after the RLF may be included in configuration information of resource pool A. In addition, according to an embodiment, the resource pool that is shifted after the RFL may be transmitted through PC5 RRC configuration when the terminal connects to the second terminal through unicasting. In addition, according to an embodiment, the resource pool that is shifted after the RFL may be pre-configured. In addition, according to an embodiment, the resource pool that is shifted after the RLF may be acquired from system information, etc.

In a wireless communication system according to an embodiment of the disclosure described above, a method of a first terminal (user equipment (UE)) may include: determining a feedback timing regarding a first physical sidelink shared channel (PSSCH) transmitted from the first terminal to a second terminal; determining a feedback timing regarding a second PSSCH transmitted from the second terminal to the first terminal; and, when the feedback timing regarding the first PSSCH and the feedback timing regarding the second PSSCH overlap in a specific time period, identifying a PSSCH among a plurality of PSSCHs based on a first priority value of the first PSSCH and a second priority value of the second PSSCH, wherein the plurality of PSSCHs include the first PSSCH and the second PSSCH, and feedback information regarding the identified PSSCH is transmitted through a physical sidelink feedback channel (PSFCH).

In a wireless communication system according to an embodiment of the disclosure described above, a first terminal (user equipment (UE)) may include at least one transceiver, and at least one processor, and the at least one processor may be configured to: determine a feedback timing regarding a first physical sidelink shared channel (PSSCH) transmitted from the first terminal to a second terminal; determine a feedback timing regarding a second PSSCH transmitted from the second terminal to the first terminal; and, when the feedback timing regarding the first PSSCH and the feedback timing regarding the second PSSCH overlap in a specific time period, identify a PSSCH among a plurality of PSSCHs based on a first priority value of the first PSSCH and a second priority value of the second PSSCH, wherein the plurality of PSSCHs include the first PSSCH and the second PSSCH, and feedback information regarding the identified PSSCH is transmitted through a physical sidelink feedback channel (PSFCH).

In a wireless communication system according to an embodiment of the disclosure described above, a method of a first terminal (user equipment (UE)) may include: determining a feedback timing regarding a first physical sidelink shared channel (PSSCH) transmitted from a second terminal to the first terminal; determining a feedback timing regarding a second PSSCH transmitted from a third terminal to the first terminal; when the feedback timing regarding the first PSSCH and the feedback timing regarding the second PSSCH overlap in a specific time period, identifying at least one PSSCH among a plurality of PSSCHs based on a first priority value of the first PSSCH and a second priority value of the second PSSCH; and transmitting feedback information regarding the at least one identified PSSCH through at least one physical sidelink feedback (PSFCH), wherein the plurality of PSSCHs include the first PSSCH and the second PSSCH.

In a wireless communication system according to an embodiment of the disclosure described above, a first terminal (user equipment (UE)) may include at least one transceiver, and at least one processor, and the at least one processor may be configured to: determine a feedback timing regarding a first physical sidelink shared channel (PSSCH) transmitted from a second terminal to the first terminal; determine a feedback timing regarding a second PSSCH transmitted from a third terminal to the first terminal; when the feedback timing regarding the first PSSCH and the feedback timing regarding the second PSSCH overlap in a specific time period, identify at least one PSSCH among a plurality of PSSCHs based on a first priority value of the first PSSCH and a second priority value of the second PSSCH; and transmit feedback information regarding the at least one identified PSSCH through at least one physical sidelink feedback (PSFCH), wherein the plurality of PSSCHs include the first PSSCH and the second PSSCH.

According to an embodiment of the disclosure described above, a method of a first terminal (user equipment (UE)) in a wireless communication system may include, when reception of a first physical sidelink feedback channel (PSFCH) regarding a first physical sidelink shared channel (PSSCH), and transmission of a second PSFCH regarding a second PSSCH overlap in a time domain, determining a PSFCH based on first sidelink control information (SCI) related to the first PSFCH and second SCI related to the second PSFCH, and transmitting or receiving feedback information through the determined PSFCH.

In an embodiment, the method may further include: transmitting the first PSSCH; and receiving the second PSSCH.

In an embodiment, the feedback information may be transmitted or received through a PSFCH which is determined based on a priority value of the first SCI and a priority value of the second SCI.

In an embodiment, the feedback information may be transmitted or received through a PSFCH which correspond to a lowest priority value among the priority values.

In an embodiment, the priority value of the first SCI may be related to a first quality of service (QoS), and the priority value of the second SCI may be related to a second QoS.

In an embodiment, the first PSFCH may include hybrid automatic repeat-request acknowledgement (HARQ-ACK) information regarding the first PSSCH, and the second PSFCH may include HARQ-ACK information regarding the second PSSCH.

In an embodiment, when the first QoS and the second QoS are the same, the feedback information may be transmitted or received through a PSFCH which is determined based on a time at which the first PSSCH is transmitted and a time at which the second PSSCH is received.

According to an embodiment of the disclosure described above, a first terminal (user equipment (UE)) in a wireless communication system may include: at least one transceiver; and at least one processor, and the at least one processor may be configured to, when reception of a first physical sidelink feedback channel (PSFCH) regarding a first physical sidelink shared channel (PSSCH), and transmission of a second PSFCH regarding a second PSSCH overlap in a time domain, determine a PSFCH based on first sidelink control information (SCI) related to the first PSFCH and second SCI related to the second PSFCH, and transmit or receive feedback information through the determined PSFCH.

In an embodiment, the at least one transceiver may further be configured to: transmit the first PSSCH; and receive the second PSSCH.

In an embodiment, the at least one processor may be configured to transmit or receive the feedback information through a PSFCH which is determined based on a priority value of the first SCI and a priority value of the second SCI.

In an embodiment, the at least one processor may be configured to transmit or receive the feedback information through a PSFCH which correspond to a lowest priority value among the priority values.

In an embodiment, the priority value of the first SCI may be related to a first quality of service (QoS), and the priority value of the second SCI may be related to a second QoS.

In an embodiment, the first PSFCH may include hybrid automatic repeat-request acknowledgement (HARQ-ACK) information regarding the first PSSCH, and the second PSFCH may include HARQ-ACK information regarding the second PSSCH.

In an embodiment, when the first QoS and the second QoS are the same, the at least one processor may be configured to transmit or receive the feedback information through a PSFCH which is determined based on a time at which the first PSSCH is transmitted and a time at which the second PSSCH is received.

According to an embodiment of the disclosure described above, a method of a first terminal (user equipment (UE)) in a wireless communication system may include, when reception of a set of first physical sidelink feedback channels (PSFCHs) regarding a set of first physical sidelink shared channels (PSSCHs), and transmission of a set of second PSFCHs regarding a set of second PSSCHs overlap in a time domain, determining a set of PSFCHs based on a set of first sidelink control information (SCI) related to the first PSFCHs and a set of second SCI related to the second PSFCHs, and transmitting feedback information through the determined set of PSFCH.

According to an embodiment of the disclosure described above, a method of a first terminal (user equipment (UE)) in a wireless communication system may include, when transmission of a first physical sidelink feedback channel (PSFCH) regarding a first physical sidelink shared channel (PSSCH), and transmission of a second PSFCH regarding a second PSSCH overlap in a time domain, determining a PSFCH based on first sidelink control information (SCI) related to the first PSFCH and second SCI related to the second PSFCH, and transmitting feedback information through the determined PSFCH.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

The invention claimed is:

1. A method performed by a first user equipment (UE) in a wireless communication system, the method comprising:
   receiving, from a second UE, first-stage sidelink control information (SCI) for a first physical sidelink shared channel (PSSCH), wherein the first-stage SCI includes information for a first priority value associated with a first physical sidelink feedback channel (PSFCH) for the first PSSCH and information for a second-stage SCI;
   receiving, from the second UE, the second-stage SCI including hybrid automatic repeat-request (HARQ) feedback enabling information based on the information for the second-stage SCI;
   receiving, from the second UE, the first PSSCH based on the first-stage SCI;
   transmitting, to the second UE, a second SCI;
   transmitting, to the second UE, a second PSSCH based on the second SCI;
   identifying a transmission of the first PSFCH for the first PSSCH and a reception of a second PSFCH for the second PSSCH overlap in a time domain; and
   transmitting the first PSFCH to the second UE or receiving the second PSFCH from the second UE based on the information for the first priority value associated with the first PSFCH and information for a second priority value associated with the second PSFCH,
   wherein whether a HARQ feedback is included in the first PSFCH is based on the HARQ feedback enabling information included in the second-stage SCI.

2. The method of claim 1, wherein the first-stage SCI is received on a first physical sidelink control channel (PSCCH) from the second UE, and
   wherein the second SCI is transmitted on a second PSCCH to the second UE.

3. The method of claim 1, wherein the second SCI includes information for the second priority value associated with the second PSFCH.

4. The method of claim 1, wherein transmitting the first PSFCH or receiving the second PSFCH comprises:
   performing the transmission of the first PSFCH or the reception of the second PSFCH corresponding to a smallest priority value among the first priority value and the second priority value.

5. The method of claim 1, wherein the information for the first priority value is associated with a first quality of service (QOS) of the first PSSCH, and
wherein the information for the second priority value is associated with a second QoS of the second PSSCH.

6. The method of claim 1, wherein the first PSFCH includes HARQ-acknowledgement (HARQ-ACK) information associated with the first PSSCH, and
wherein the second PSFCH includes HARQ-ACK information associated with the second PSSCH.

7. The method of claim 1, wherein the first-stage SCI includes information for a time-domain resource and information for a frequency domain resource.

8. A first user equipment (UE) in a wireless communication system, the first UE comprising:
a transceiver; and
a controller coupled with the transceiver and configured to:
receive, from a second UE, first-stage sidelink control information (SCI) for a first physical sidelink shared channel (PSSCH), wherein the first-stage SCI includes information for a first priority value associated with a first physical sidelink feedback channel (PSFCH) for the first PSSCH and information for a second-stage SCI,
receive, from the second UE, the second-stage SCI including hybrid automatic repeat-request (HARQ) feedback enabling information based on the information for the second-stage SCI,
receive, from the second UE, the first PSSCH based on the first-stage SCI, transmit, to the second UE, a second SCI,
transmit, to the second UE, a second PSSCH based on the second SCI,
identify a transmission of the first PSFCH for the first PSSCH, and a reception of a second PSFCH for the second PSSCH overlap in a time domain, and
transmit the first PSFCH to the second UE or receive the second PSFCH from the second UE based on the information for the first priority value associated with the first PSFCH and information for a second priority value associated with the second PSFCH,
wherein whether a HARQ feedback is included in the first PSFCH is based on the HARQ feedback enabling information included in the second-stage SCI.

9. The first UE of claim 8, wherein the first-stage SCI is received on a first physical sidelink control channel (PSCCH) from the second UE, and
wherein the second SCI is transmitted on a second PSCCH to the second UE.

10. The first UE of claim 8, wherein the second SCI includes information for the second priority value associated with the second PSFCH.

11. The first UE of claim 8, wherein the controller is further configured to perform the transmission of the first PSFCH or the reception of the second PSFCH corresponding to a smallest priority value among the first priority value and the second priority value.

12. The first UE of claim 8, wherein the information for the first priority value is associated with a first quality of service (QOS) of the first PSSCH, and
wherein the information for the second priority value is associated with a second QoS of the second PSSCH.

13. The first UE of claim 8, wherein the first PSFCH includes HARQ-acknowledgement (HARQ-ACK) information associated with the first PSSCH, and
wherein the second PSFCH includes HARQ-ACK information associated with the second PSSCH.

14. The first UE of claim 8, wherein the first-stage SCI includes information for a time-domain resource and information for a frequency domain resource.

15. A method performed by a second user equipment (UE) in a wireless communication system, the method comprising:
transmitting, to a first UE, first-stage sidelink control information (SCI) for a first physical sidelink shared channel (PSSCH), wherein the first-stage SCI includes information for a first priority value associated with a first physical sidelink feedback channel (PSFCH) for the first PSSCH and information for a second-stage SCI;
transmitting, to the first UE, the second-stage SCI including hybrid automatic repeat-request (HARQ) feedback enabling information based on the information for the second-stage SCI;
transmitting, to the first UE, the first PSSCH based on the first-stage SCI;
receiving, from the first UE, a second SCI;
receiving, from the first UE, a second PSSCH based on the second SCI; and
receiving the first PSFCH from the first UE or transmitting a second PSFCH for the second PSSCH to the first UE based on the information for the first priority value associated with the first PSFCH and information for a second priority value associated with the second PSFCH,
wherein a reception of the first PSFCH for the first PSSCH and a transmission of the second PSFCH for the second PSSCH overlap in a time domain, and
wherein whether a HARQ feedback is included in the first PSFCH is based on the HARQ feedback enabling information included in the second-stage SCI.

16. The method of claim 15, wherein the first-stage SCI is transmitted on a first physical sidelink control channel (PSCCH) to the first UE, and
wherein the second SCI is received on a second PSCCH from the first UE.

17. The method of claim 15, wherein the second SCI includes information for the second priority value associated with the second PSFCH.

18. A second user equipment (UE) in a wireless communication system, the second UE comprising:
a transceiver; and
a controller coupled with the transceiver and configured to:
transmit, to a first UE, first-stage sidelink control information (SCI) for a first physical sidelink shared channel (PSSCH), wherein the first-stage SCI includes information for a first priority value associated with a first physical sidelink feedback channel (PSFCH) for the first PSSCH and information for a second-stage SCI,
transmit, to the first UE, the second-stage SCI including hybrid automatic repeat-request (HARQ) feedback enabling information based on the information for the second-stage SCI,
transmit, to the first UE, the first PSSCH based on the first-stage SCI,
receive, from the first UE, a second SCI,
receive, from the first UE, a second PSSCH based on the second SCI, and
receive the first PSFCH from the first UE or transmit a second PSFCH for the second PSSCH to the first UE based on the information for the first priority value associated with the first PSFCH and information for a second priority value associated with the second PSFCH, wherein a reception of the first PSFCH for the first PSSCH and a transmission of the second PSFCH for the second PSSCH overlap in a time domain, and wherein whether a HARQ feedback is included in the first PSFCH is based on the HARQ feedback enabling information included in the second-stage SCI.

19. The second UE of claim 18, wherein the first-stage SCI is transmitted on a first physical sidelink control channel (PSCCH) to the first UE, and wherein the second SCI is received on a second PSCCH from the first UE.

20. The second UE of claim 18, wherein the second SCI includes information for the second priority value associated with the second PSFCH.

* * * * *